United States Patent
Cao

(10) Patent No.: US 11,265,069 B2
(45) Date of Patent: Mar. 1, 2022

(54) ELECTRONIC DEVICE, METHOD AND STORAGE MEDIUM FOR WIRELESS COMMUNICATION SYSTEM

(71) Applicant: Sony Corporation, Tokyo (JP)

(72) Inventor: Jianfei Cao, Beijing (CN)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/640,731

(22) PCT Filed: Sep. 7, 2018

(86) PCT No.: PCT/CN2018/104497
§ 371 (c)(1),
(2) Date: Feb. 21, 2020

(87) PCT Pub. No.: WO2019/052400
PCT Pub. Date: Mar. 21, 2019

(65) Prior Publication Data
US 2020/0186231 A1 Jun. 11, 2020

(30) Foreign Application Priority Data
Sep. 12, 2017 (CN) .......................... 201710814633.X

(51) Int. Cl.
*H04B 7/08* (2006.01)
*H04B 7/06* (2006.01)
(Continued)

(52) U.S. Cl.
CPC ........... *H04B 7/088* (2013.01); *H04B 7/0686* (2013.01); *H04B 7/0814* (2013.01);
(Continued)

(58) Field of Classification Search
CPC .... H04B 7/063; H04B 7/0686; H04B 7/0695; H04B 7/0814; H04B 7/088; H04L 5/0048;
(Continued)

(56) References Cited

U.S. PATENT DOCUMENTS

2017/0033854 A1* 2/2017 Yoo .................. H04W 24/00
2018/0249394 A1* 8/2018 Nilsson ............... H04W 40/12
2019/0014568 A1* 1/2019 Nilsson ............... H04W 24/08

FOREIGN PATENT DOCUMENTS

| CN | 105871437 A | 8/2016 |
| CN | 105959966 A | 9/2016 |
| EP | 3131328 A1 | 2/2017 |

OTHER PUBLICATIONS

International Search Report and Written Opinion dated Dec. 3, 2018 for PCT/CN2018/104497 filed on Sep. 7, 2018, 8 pages including English Translation of the International Search Report.
(Continued)

*Primary Examiner* — Minh Trang T Nguyen
(74) *Attorney, Agent, or Firm* — Xsensus, LLP

(57) ABSTRACT

The present disclosure relates to an electronic device, a method, and a storage medium for a wireless communication system. Various embodiments are described with respect to beam pair link. In one embodiment, the electronic device used at the base station side in the wireless communication system may comprise a processing circuitry configured to monitor status of an uplink signal; determine it necessary to adjust a first uplink beam pair link (BPL) based on the status of the uplink signal, wherein the first uplink BPL comprises a first transmitting beam at a terminal device side and a first receiving beam at the BS side; and perform operations in order to adjust the first uplink BPL.

20 Claims, 28 Drawing Sheets

(51) Int. Cl.
*H04L 5/00* (2006.01)
*H04W 72/04* (2009.01)
*H04W 72/08* (2009.01)

(52) U.S. Cl.
CPC ......... *H04L 5/0048* (2013.01); *H04W 72/042* (2013.01); *H04W 72/0413* (2013.01); *H04W 72/08* (2013.01)

(58) Field of Classification Search
CPC .......... H04W 72/0413; H04W 72/042; H04W 72/08
See application file for complete search history.

(56) References Cited

OTHER PUBLICATIONS

Intel Corporation, "Details for UL Beam Management," 3GPP TSG-RAN WG1 No. 88bis, R1-1704723, Spokane, USA, Apr. 3-7, 2017, pp. 1-6.

Intel Corporation, "Details for UL Beam Management," 3GPP TSG-RAN WG1 No. 88bis, R1-1707354, Hangzhou, China, May 15-19, 2017, pp. 1-7.

Intel Corporation, "Details for UL Beam Management," 3GPP TSG-RAN WG1 NR AdHoc No. 2, R1-1710525, Qingdao, China, Jun. 27-30, 2017, pp. 1-9.

* cited by examiner

700

| TX_Beam ID 1 | TX_Beam ID 2 | TX_Beam ID 3 | ... ... |

| TX_Beam ID 1 + "1" | TX_Beam ID 2 + "0" | TX_Beam ID 3 + "1" | ... ... |

FIG. 7B

| Identification of beams at the base station side | Identification of beams at the terminal device side | BPL Tag |
|---|---|---|
| 1 | 1 | 0 |
| 1 | 2 | 0 |
| 3 | 4 | 1 |
| 4 | 4 | 2 |

| Identification of beams at the base station side | Identification of beams at the terminal device side | BPL Tag |
|---|---|---|
| 1 | 1 | 0 |
| 1 | 2 | 1 |
| 3 | 4 | 2 |
| 4 | 4 | 2 |

| Identification of beams at the base station side | Identification of beams at the terminal device side | BPL Tag |
|---|---|---|
| 1 | 1 | 0 |
| 1 | 2 | 1 |
| 3 | 4 | 2 |
| 4 | 4 | 3 |

# ELECTRONIC DEVICE, METHOD AND STORAGE MEDIUM FOR WIRELESS COMMUNICATION SYSTEM

CROSS-REFERENCE TO RELATED APPLICATIONS

The present application is based on PCT filing PCT/CN2018/104497, filed Sep. 7, 2018, which claims priority to CN 201710814633.X, filed Sep. 12, 2017, the entire contents of each are incorporated herein by reference.

TECHNICAL FIELD

The present disclosure relates generally to wireless communication system, and in particular, to techniques for maintaining beam pair links.

BACKGROUND ART

In recent years, with the development and wide application of mobile internet technology, wireless communication has unprecedentedly met people's needs for voice and data communication. In order to provide even higher communication quality and capacity, wireless communication system employs various technologies at different layers, such as beamforming techniques. Beamforming can provide beamforming gain to compensate for loss of radio signals by increasing the directivity of antenna transmission and/or reception. In future wireless communication systems (such as 5G systems like NR (New Radio) system, for example), the number of antenna ports at the base station and the terminal device sides will further increase. For example, the number of antenna ports at the base station side may increase to hundreds or even more, constituting a Massive MIMO system. Thus, in large-scale antenna systems, beamforming will have a larger application space.

In the beam sweeping technology, the matching transmitting beam and receiving beam between a base station and a terminal device is found via a Beam Sweeping process, thereby establishing a beam pair link (Beam Pair Link, BPL) between the base station and the terminal device. The beam sweeping can be performed in the uplink and downlink respectively, accordingly, an uplink and downlink beam pair links can be established. However, such beam pair links appear not stable enough due to the links being susceptible to factors like environment etc. For example, in the case that there is line-of-sight obstruction or terminal device moving or rotating, the quality of beam pair links may deteriorate or even fail. This phenomenon is more pronounced at high frequencies.

SUMMARY OF THE INVENTION

One aspect of the present disclosure relates to an electronic device for a base station side in a wireless communication system. According to one embodiment, the electronic device can comprise processing circuitry. The processing circuitry can be configured to monitor status of an uplink signal; determine it necessary to adjust a first uplink beam pair link (BPL) based on the status of the uplink signal, wherein the first uplink BPL comprises a first transmitting beam at a terminal device side and a first receiving beam at the BS side; and perform operations in order to adjust the first uplink BPL.

One aspect of the present disclosure relates to an electronic device for a terminal device side in a wireless communication system. According to one embodiment, the electronic device comprises a processing circuitry. The processing circuitry can be configured to transmit an uplink signal through a first uplink beam pair link (BPL), wherein the first uplink BPL comprises a first transmitting beam at the terminal device side and a first receiving beam at a base station (BS) side; and receive a message for adjusting from the BS which message indicates adjustment to the first uplink BPL.

One aspect of the present disclosure relates to an electronic device for a terminal device side in a wireless communication system. According to one embodiment, the electronic device comprises a processing circuitry. The processing circuitry can be configured to transmit a uplink signal through a first uplink beam pair link (BPL), wherein the first uplink BPL comprises a first transmitting beam at the terminal device side and a first receiving beam at a base station (BS) side; receive a message for adjusting from the BS which message indicates adjustment to the first uplink BPL; and transmit to the BS feedback on the message for adjusting.

Another aspect of the present disclosure relates to a wireless communication method. In one embodiment, the method can comprise monitoring status of an uplink signal; determining it necessary to adjust a first uplink beam pair link (BPL) based on the status of the uplink signal, wherein the first uplink BPL comprises a first transmitting beam at a terminal device side and a first receiving beam at the BS side; and performing operations in order to adjust the first uplink BPL.

Another aspect of the present disclosure relates to a wireless communication method. In one embodiment, the method can comprise transmitting an uplink signal through a first uplink beam pair link (BPL), wherein the first uplink BPL comprises a first transmitting beam at the terminal device side and a first receiving beam at a base station (BS) side; and receiving a message for adjusting from the BS which message indicates adjustment to the first uplink BPL.

Another aspect of the present disclosure relates to a wireless communication method. In one embodiment, the method can comprise transmitting a uplink signal through a first uplink beam pair link (BPL), wherein the first uplink BPL comprises a first transmitting beam at the terminal device side and a first receiving beam at a base station (BS) side; receiving a message for adjusting from the BS which message indicates adjustment to the first uplink BPL; and transmitting to the BS feedback on the message for adjusting.

Yet another aspect of the present disclosure relates to a computer-readable storage medium storing one or more instructions. In some embodiments, the one or more instructions can, when executed by one or more processors of an electronic device, cause the electronic device to perform the methods according to various embodiments of the present disclosure.

Yet another aspect of the present disclosure relates to various apparatus including means or units for performing operations of methods according to embodiments of the present disclosure.

The above summary is provided to summarize some exemplary embodiments in order to provide a basic understanding of the various aspects of the subject matter described herein. Therefore, the above-described features are merely examples and should not be construed as limiting the scope or spirit of the subject matter described herein in any way. Other features, aspects, and advantages of the subject matter described herein will become apparent from the Detailed Description described below in conjunction with the drawings.

DRAWINGS

A better understanding of the present disclosure can be achieved by referring to the detailed description given hereinafter in connection with the accompanying drawings, wherein same or similar reference signs are used to indicate same or similar components throughout the figures. The figures are included in the specification and form a part of the specification along with the following detailed descriptions, for further illustrating embodiments herein and explaining the theory and advantages of the present disclosure. Wherein:

FIG. 7A illustrates an example message for BPL adjusting reflecting an adjusted BPL according to an embodiment of the present disclosure.

FIG. 7B illustrates an example message for BPL adjusting reflecting a BPL to be adjusted according to an embodiment of the present disclosure.

Figure 1:
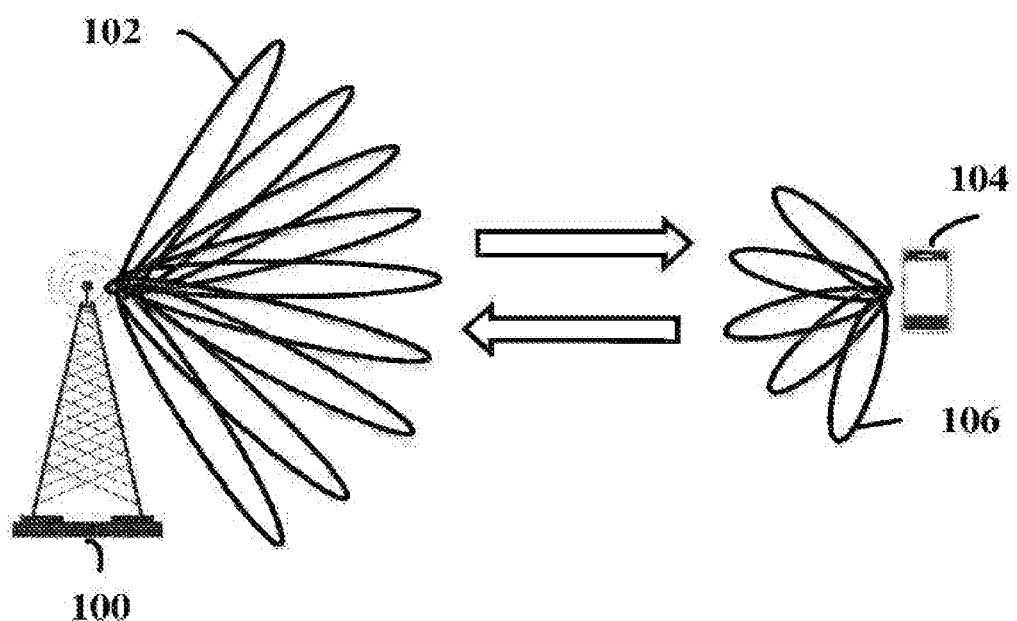
FIG. 1 depicts an exemplary beam sweeping process in a wireless communication system.

While the embodiments herein are susceptible to various modifications and alternative forms, the specific embodiments thereof are illustrated in the drawings by way of example and are described in detail herein. It should be understood, however, that the drawings and the detailed description thereof are not intended to limit the embodiments to the specific forms as disclosed, rather, it is intended to cover all modifications, equivalents and alternatives falling within the spirit and scope of the claims.

DESCRIPTION OF EMBODIMENTS

Representative applications of various aspects of the device and method and the like according to the present disclosure are described below. These examples are described only to add context and to help understand the embodiments described. Therefore, it is apparent to a person skilled in the art that the embodiments described below can be implemented without some or all of the specific details. In other cases, well-known process steps have not been described in detail in order to avoid unnecessarily obscuring the embodiments described. Other applications are possible, and the solutions of the present disclosure are not limited to these examples.

A beam sweeping process in a wireless communication system will be briefly introduced below with reference to FIG. 1. The right arrow in FIG. 1 indicates the downlink direction from a base station 100 to a terminal device 104, and the left arrow indicates the uplink direction from the terminal device 104 to the base station 100. As shown in FIG. 1, the base station 100 includes $n_{t\_DL}$ downlink transmitting beams ($n_{t\_DL}$ is a natural number greater than or equal to 1, and exemplified in FIG. 1 as $n_{t\_DL}=9$), and the terminal device 104 includes $n_{r\_DL}$ downlink receiving beams ($n_{r\_DL}$ is a natural number greater than or equal to 1, exemplified in FIG. 1 as $n_{r\_DL}=5$). In addition, in the wireless communication system shown in FIG. 1, the number of uplink receiving beams $n_{r\_DL}$ of the base station 100 and the coverage of each beam are the same as those of downlink transmitting beams, and the number of uplink transmitting beams $n_{t\_UL}$ of the terminal device 104 and the coverage of each beam are the same as those of downlink receiving beams. It should be understood that, according to the system requirements and settings, the coverage and the number of uplink receiving beams and downlink transmitting beams of a base station may be different, and the same is true for a terminal device.

As shown in FIG. 1, during a downlink beam sweeping process, each downlink transmitting beam 102 of the $n_{t\_DL}$ downlink transmitting beams of the base station 100 transmits $n_{r\_DL}$ downlink reference signals to the terminal device 104, and the terminal device 104 receives the $n_{r\_DL}$ downlink reference signals through the $n_{r\_DL}$ downlink receiving beams respectively. In this way, the $n_{t\_DL}$ downlink transmitting beams of the base station 100 sequentially transmit $n_{t\_DL} \times n_{r\_DL}$ downlink reference signals to the terminal device 104, and each downlink receiving beam 106 of the terminal device 104 receives $n_{t\_DL}$ downlink reference signals, that is, the $n_{r\_DL}$ downlink receiving beams of the terminal device 104 receive a total of $n_{t\_DL} \times n_{r\_DL}$ downlink reference signals from the base station 100. The terminal device 104 measures the $n_{t\_DL} \times n_{r\_DL}$ downlink reference signals (such as measuring the received signal power of the downlink reference signal (such as RSRP)), so that the downlink transmitting beam of the base station 100 and the downlink receiving beam of the terminal device 104 when the measurement result is better or the best are determined as the matched transmitting and receiving beam pairs of the downlink, and a downlink beam pair link (hereinafter referred to as BPL) is established.

During an uplink beam sweeping process, similar to the downlink beam sweeping, each uplink transmitting beam 106 of the $n_{t\_UL}$ uplink transmitting beams of the terminal device 104 transmits the $n_{r\_UL}$ uplink reference signals to the base station 100, and the base station 100 receives the $n_{r\_UL}$ uplink reference signals through the $n_{r\_UL}$ uplink receiving beams respectively. In this way, the $n_{t\_UL}$ uplink transmitting beams of the terminal device 104 sequentially transmit $n_{t\_UL} \times n_{r\_UL}$ uplink reference signals to the base station 100, and each uplink receiving beam 102 of the base station 100 receives $n_{t\_UL}$ uplink reference signals, that is, the $n_{r\_UL}$ uplink receiving beams of the base station 100 receive a total of $n_{r\_UL} \times n_{t\_UL}$ uplink reference signals from the terminal device 104. The base station 100 measures the $n_{r\_UL} \times n_{t\_UL}$ uplink reference signals (such as measuring the received signal power of the uplink reference signal (such as RSRP)), so that the uplink transmitting beam of the terminal device 104 and the uplink receiving beam of the base station 100 when the measurement result is better or the best are determined as the matched transmitting and receiving beam pairs of the uplink, and an uplink beam pair link is established.

It should be understood that the coverage and the number of uplink receiving beams and downlink transmitting beams of a base station may be different and the coverage and the number of uplink transmitting beams and downlink receiving beams of a terminal device may be different, and the above determination operation can still be similarly carried out.

Receiving beams and transmitting beams of a base station and a terminal device can be generated by a Discrete Fourier Transform (DFT) vector. A downlink transmitting beam at a base station side is used below as an example for description. An uplink receiving beam at a base station side and a transmitting beam and a receiving beam at a terminal device side can also be generated by similar methods.

For example, assuming that a base station side is equipped with $n_t$ transmitting antennas, an equivalent channel from the base station to a terminal device can be expressed as one $n_t \times 1$ vector H. The DFT vector u can be expressed as:

$$u = \begin{bmatrix} 1 & e^{j\frac{2\pi}{C}} & \cdots & e^{j\frac{2\pi(n_t-1)}{C}} \end{bmatrix}^T \quad \text{[Equation 1]}$$

Wherein, the length of the DFT vector u is $n_t$, C represents a parameter for adjusting the beam width and beamforming gain, and "T" represents a transposition operator.

One transmitting beam of the base station can be obtained by multiplying the equivalent channel H from the base station to the terminal device by the DFT vector u (for example, one of the downlink transmitting beams shown in FIG. 1).

In one embodiment, the parameter C for adjusting the beam width and beamforming gain in Equation 1 can be expressed by the product of two parameters $O_2$ and $N_2$, and by adjusting the two parameters $O_2$ and $N_2$, respectively, the beam width and beamforming gain can be adjusted. Generally, the larger the number of antennas $n_t$ or the larger the parameter C (for example, the product of $O_2$ and $N_2$), the stronger the spatial directivity of the obtained beam, but the narrower the beam width in general. In one embodiment, $O_2=1$ and $N_2=1$ can be taken, and the DFT vector u thus obtained is a vector in which $n_t$ elements are all 1.

After completing the downlink beam sweeping and uplink beam sweeping processes, following data and/or control signal transmission is performed by utilizing the established BPL. The process of determining a matching transmitting and receiving beam pair of a base station and a terminal device through beam sweeping described above is sometimes referred to as a Beam Training process.

In an embodiment of the present disclosure, the BPL can be established by a matching transmitting beam and receiving beam. Generally, the matching of a transmitting beam and a receiving beam may refer to that the quality of communication using the transmitting beam and the receiving beam meets a certain threshold level (thus, it can be considered that the quality of the BPL also meets a certain threshold level). In some cases, the BPL can comprise one transmitting beam and one receiving beam that are matched. However, in other cases, the matched transmitting and receiving beams may not be in a one-to-one relationship. For example, there could be two receiving beams and one transmitting beam that are matched. At this time, it can be considered that each receiving beam forms one BPL with the same transmitting beam. In some embodiments, this example is referred to as the transmitting beam being overlapped for multiple receiving beams. As another example, there could be one receiving beam and two transmitting beams that are matched. At this time, it can be considered that this one receiving beam form one BPL with the two transmitting beams, respectively. In some embodiments, this example is referred to as the receiving beam being overlapped for multiple transmitting beams.

According to an embodiment of the present disclosure, the BPL may be divided into uplink BPL and downlink BPL. In one embodiment, uplink BPL can comprise a transmitting beam at a terminal device side and a receiving beam at a base station side. Similarly, downlink BPL can comprise a transmitting beam at a base station side and a receiving beam at a terminal device side.

According to an embodiment of the present disclosure, the BPL can comprise activated BPL and standby BPL. In one embodiment, activated BPL may refer to the BPL being used in the current uplink or downlink communication (generally with good quality), and standby BPL may refer to the BPL that is not used in the current uplink or downlink communication but may be available as a standby (generally with acceptable quality). In one embodiment, there may be one or more activated BPLs in the uplink and downlink, and there may also be one or more standby BPLs. Herein, unless specifically defined, references to the terms BPL, uplink and downlink BPL generally mean activated BPL.

In one embodiment, the adjustment of any one of a transmitting beam and a receiving beam forming the BPL can be considered as the adjustment of the BPL. Therefore, situations of BPL adjustment include, but are not limited to: adjusting the transmitting beam, adjusting the receiving beam, adjusting both the transmitting beam and the receiving beam, establishing a BPL, and so on. Embodiments of the present disclosure are not limited in this regard.

Figure 2:
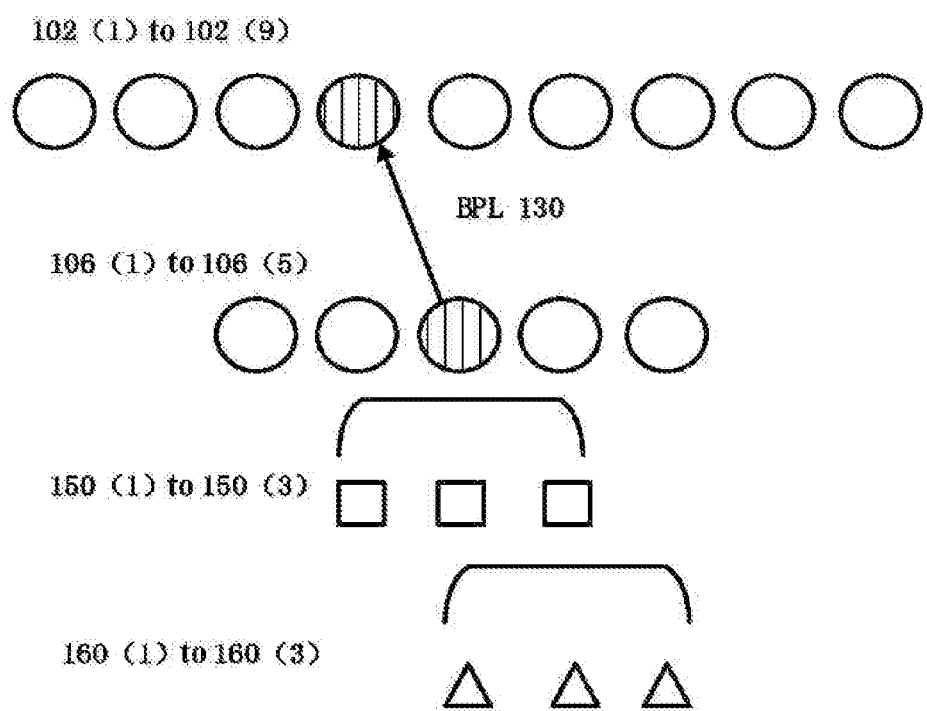
FIG. 2 illustrates an example of an uplink BPL according to an embodiment of the present disclosure.

FIG. 2 illustrates an example of an uplink BPL according to an embodiment of the present disclosure. In FIG. 2, the nine receiving beams 102 of the base station 100 in FIG. 1 are marked as 102 (1) to 102 (9) respectively, and the five transmitting beams 106 of the terminal device 104 in FIG. 1 are marked as 106 (1) To 106 (5) respectively. In FIG. 2, a first uplink BPL 130 is established by the matched transmitting beam 106 (3) and a receiving beam 102 (4). In an embodiment of the present disclosure, the transmitting beams 106 (1) to 106 (5) may have one or more reference signal ports, respectively. For example, the transmitting beam 106 (3) has three reference signal ports 150 (1) to 150 (3). The reference signal ports 150 (1) to 150 (3) may correspond to one or more groups of reference signal resources, respectively. For example, reference signal port 150 (3) may correspond to three groups of reference signal resources 160 (1) to 160 (3). Therefore, there may be a correspondence between reference signal resource and a transmitting beam at a terminal device side. In FIG. 2, the second uplink BPL may also be established by using other matched transmitting beam and receiving beam.

Figure 3A:
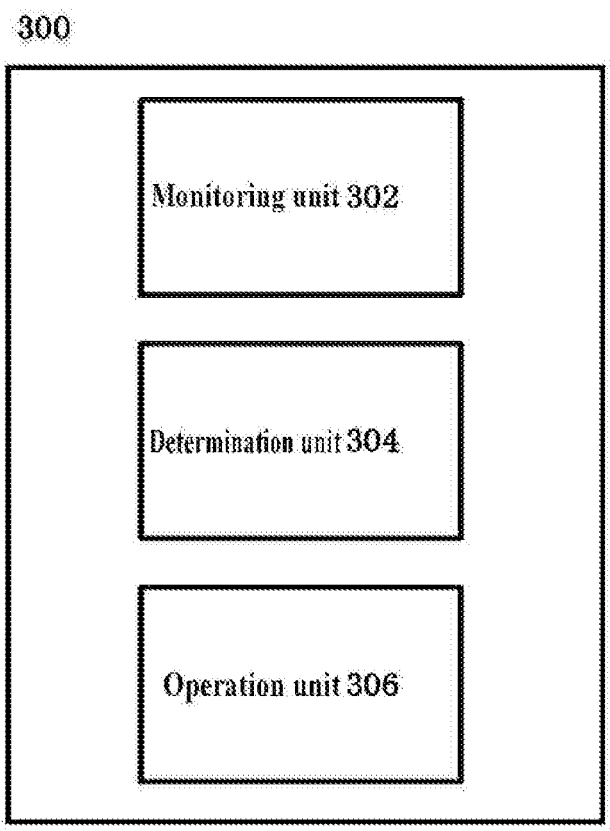
FIG. 3A illustrates an exemplary electronic device for a base station side according to an embodiment of the present disclosure.

FIG. 3A illustrates an exemplary electronic device for a base station side according to an embodiment of the present disclosure, where the base station can be used in various wireless communication systems. The electronic device 300 shown in FIG. 3A can include various units to implement various embodiments according to the present disclosure. In this example, the electronic device 300 may include a monitoring unit 302, a determination unit 304, and an operation unit 306. In one implementation, the electronic device 300 may be implemented as the base station 100 in FIG. 1 or a part of it, or may be implemented as a device for controlling the base station 100 or otherwise related to the base station 100 (for example, a base station controller) or a part of the device. The various operations described below in connection with the base station can be implemented by units 302 to 306 or other possible units of the electronic device 300.

In one embodiment, the monitoring unit 302 can be configured to monitor status of various uplink signals. Examples of uplink signals and corresponding monitoring processing will be described in detail below. In one embodiment, the determination unit 304 can be configured to determine whether it is necessary to adjust an uplink BPL (for example, a first uplink BPL 130) based on the status of the uplink signal. For example, when the received power, the received quality, and the like of the uplink signal meet certain conditions, the determination unit 304 may determine that the first uplink BPL 130 needs to be adjusted. In one embodiment, the operation unit 306 can be configured to perform operations so as to adjust the first uplink BPL 130. In a further embodiment, operations performed can comprise adjusting a receiving beam (for example, 102 (4)) at the base station side, and/or transmitting a message to a terminal device indicating the adjustment of the first uplink BPL 130. Herein, the message indicating the BPL adjustment may sometimes be simply referred to as a "message for BPL adjusting" or "message for adjusting".

Figure 3B:
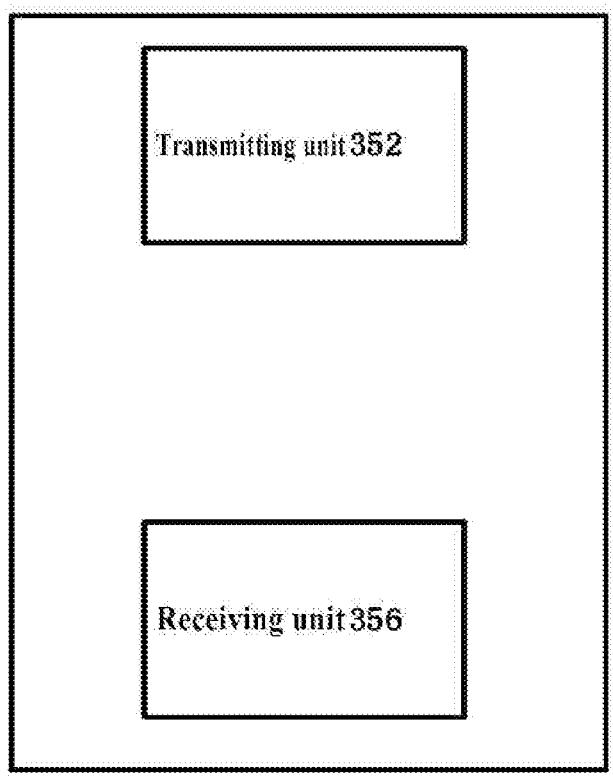
FIG. 3B illustrates an exemplary electronic device for a terminal device side according to an embodiment of the present disclosure.

FIG. 3B illustrates an exemplary electronic device for a terminal device side according to an embodiment of the present disclosure, where the terminal device can be used in various wireless communication systems. The electronic device 350 shown in FIG. 3B can include various units to implement various embodiments according to the present disclosure. In this example, the electronic device 350 can include a transmitting unit 352 and a receiving unit 356. In one implementation, the electronic device 350 may be implemented as the terminal device 104 in FIG. 1 or a part of it. The various operations described below in connection with the terminal device can be implemented by units 352 to 356 or other possible units of the electronic device 350.

In one embodiment, the transmitting unit 352 can be configured to transmit an uplink signal through an uplink BPL (for example, the first uplink BPL 130). In one embodiment, the receiving unit 356 can be configured to receive a message from the base station indicating an uplink BPL adjustment.

In some embodiments, the electronic devices 300 and 350 may be implemented at the chip level, or may also be implemented at the device level by including other external components. For example, each electronic device can work as a communication device as a whole machine.

It should be noted that the above various units are only logical modules divided according to the specific functions they implement, and are not intended to limit specific implementations, for example, they can be implemented in software, hardware, or a combination of software and hardware. In actual implementation, the above various units may be implemented as independent physical entities, or may be implemented by a single entity (for example, a processor (CPU or DSP, etc.), an integrated circuit, or the like). Wherein, the processing circuitry may refer to various implementations of a digital circuitry, an analog circuitry, or a mixed signal (combination of analog and digital) circuitry that perform functions in a computing system. The processing circuitry can comprise, for example, a circuit such as an integrated circuit (IC), an application specific integrated circuit (ASIC), a portion or circuit of a separate processor core, the entire processor core, a separate processor, a programmable hardware device such as a field programmable gate array (FPGA), and/or a system including multiple processors.

Figure 3C:
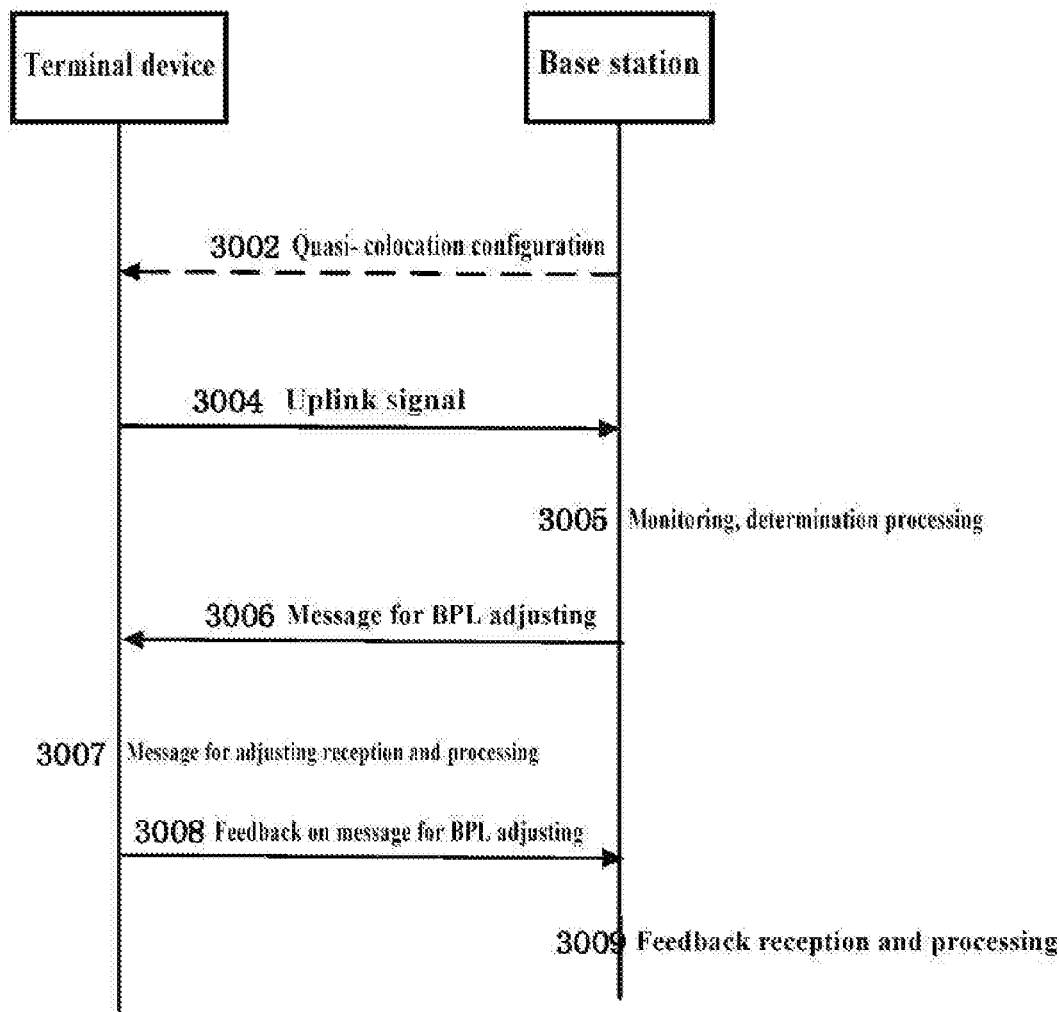
FIG. 3C illustrates an example process between a base station and a terminal device for uplink BPL adjustment according to an embodiment of the present disclosure.

FIG. 3C illustrates an example process between a base station and a terminal device for uplink BPL adjustment according to an embodiment of the present disclosure. This example process may be performed by the electronic device 300 and the electronic device 350 described above.

As shown in FIG. 3C, at 3004, a terminal device (for example, the electronic device 350) may transmit an uplink signal to a base station (for example, the electronic device 300). According to various embodiments of the present disclosure, the uplink signal can comprise an uplink control signal (for example, PUCCH, NR-PUCCH), a demodulation reference signal accompanying uplink control channel and shared channel (for example, a DMRS accompanying PUCCH, NR-PUCCH, an NR-DMRS accompanying PUSCH, NR-PUSCH) and an uplink sounding reference signal (for example, SRS, NR-SRS). In one embodiment, in a case where uplink BPL adjustment is determined based on the uplink sounding reference signal, the sounding reference signal and the uplink control signal are required to be quasi-colocation. Therefore, in this embodiment, before transmitting such an uplink signal, an appropriate quasi-colocation configuration can be conducted by the base station, as shown at 3002.

At 3005, the base station detects status of the uplink signal and determines whether the uplink BPL of the terminal device needs to be adjusted based on the status of the uplink signal. The base station can determine that it is necessary to adjust the uplink BPL of the terminal device, when appropriate, for example, if the uplink control signal cannot be correctly detected or if the reference signal received power is lower than a predetermined threshold. Next, at 3006, the base station transmits a message for uplink BPL adjusting to the terminal device.

At 3007, the terminal device receives the message for BPL adjusting and processes on it. For example, the terminal device may determine the BPL related to the adjustment and related transmitting and/or receiving beams based on the message for BPL adjusting. In one embodiment, the terminal device may obtain a time for adjusting specified by the base station based on the message for BPL adjusting, and determine the actual time for adjusting according to local conditions. The time for adjusting may be the same as or different from the time for adjusting specified by the base station.

At 3008, the terminal device may transmit feedback to the base station on the message for BPL adjusting. The feedback may be a NACK feedback if the terminal device does not receive the message for BPL adjusting correctly. The feedback may be an ACK feedback if the message for BPL adjusting is correctly received. In one embodiment, the actual time for adjusting mentioned above (the actual time for adjusting is not required when adjusting transmitting beams at the base station side) may be included in the ACK feedback and transmitted to the base station together. In one embodiment, the ACK and NACK feedbacks may be transmitted through a current activated BPL. In another embodiment, the ACK feedback may be transmitted alternatively or additionally through an adjusted BPL. At 3009, the base station receives and processes the feedback on the message for BPL adjusting.

An example electronic device and processing operations performed according to an embodiment of the present disclosure have been briefly describes above with reference to FIGS. 3A to 3C. These processing operations will be described in detail below.

Uplink Signal Transmission

In an embodiment of the present disclosure, an uplink signal can comprise at least one of various uplink signals. For example, the uplink signal can comprise at least one of an uplink control signal or an uplink reference signal. In some embodiments, the uplink control signal may be a PUCCH signal in an LTE system or an NR-PUCCH signal in an NR system. In other embodiments, the uplink reference signal may be a Sounding Reference Signal (SRS) in the LTE system, a Demodulation Reference Signal (DMRS) accompanying the PUCCH or PUSCH, or an NR-SRS, NR-DMRS in the NR system. In embodiments of the present disclosure, description may be made mainly with reference to an uplink signal in a certain communication system. It should be understood, however, that these embodiments are equally applicable to other communication systems.

In the communication system of the present disclosure, an uplink control signal is generally used by a terminal device to transmit control information related to communication to a base station. Taking the PUCCH signal as an example, situations where the terminal device needs to transmit the signal to the base station can comprise: transmitting a HARQ acknowledgement to the base station to indicate whether a downlink transmission block is successfully received; transmitting a channel status report to the base station to assist in channel-dependent scheduling; and requesting resources from the base station to transmit uplink data. In an embodiment of the present disclosure, an electronic device 350 at a terminal device side may transmit an uplink control signal through the uplink BPL in a case of including, but not limited to, the above example situations. The uplink BPL used to transmit the uplink control signal is generally an activated BPL between the terminal device and the base station. Accordingly, an electronic device 300 at a base station side can monitor the status of the uplink control signal for determining the quality of the activated uplink BPL based on the monitoring.

In the communication system of the present disclosure, different uplink reference signals have different usage scenarios and purposes. Taking the LTE system as an example, the DMRS is mainly transmitted along with the PUCCH or PUSCH for the base station to perform channel state estimation and related demodulation. The SRS may be transmitted periodically or aperiodically for the base station to perform channel state estimation in order to support uplink channel-dependent scheduling and link adaptation. In an embodiment of the present disclosure, the electronic device 350 may transmit an uplink reference signal through an activated uplink BPL when the uplink reference signal needs to be transmitted. Accordingly, the electronic device 300 can monitor the status of the uplink reference signal and determine the quality of the uplink BPL (i.e., the activated uplink BPL) used to transmit the uplink reference signal based on the monitoring.

Figure 4A:
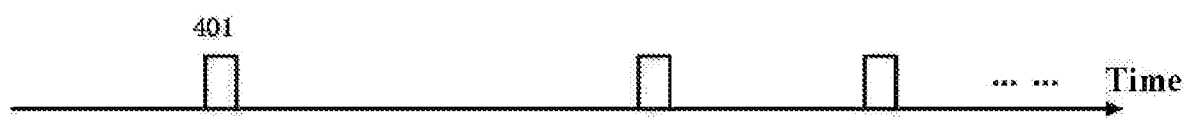
FIG. 4A illustrates a first example of uplink signal transmission according to an embodiment of the present disclosure.

FIG. 4A illustrates a first example of uplink signal transmission according to an embodiment of the present disclosure. In FIG. 4A, a PUCCH signal 401 may be transmitted by an electronic device 350 when needed (for example, HARQ ACK/NACK, channel status report needs to be transmitted). The PUCCH signal 401 may be transmitted through an activated BPL, that is, transmitted through a transmitting beam at a terminal device side included in the activated BPL. An electronic device 300 can receive the PUCCH signal 401 and monitor its status for determining the quality of the activated BPL based on the monitoring. It should be understood that the transmission of DMRS (and NR-DMRS) is generally the same as this example, and the transmission can be conducted by referring to this example.

According to an embodiment of the present disclosure, the situation is slightly different for determining the quality of an uplink BPL based on an SRS (and an NR-SRS) and other uplink signals. As noted above, the uplink control signals are originally transmitted through an activated uplink BPL (the situation is similar for demodulating reference signals). Therefore, it is natural to determine the quality of the uplink BPL based on the uplink control signal (thus, there is no need to configure the BPL or transmitting beam used to transmit the uplink control signal). However, the SRS may not (or not always) be transmitted through the activated uplink BPL, and the resources used for the SRS may be different from the resources of the activated uplink BPL (refer to the description of FIG. 2). Therefore, the SRS may experience different spatial channel conditions than the activated BPL, which may in turn affect the accuracy in determining the quality of the BPL based on the status of the SRS.

In response to the above problem, in one embodiment, the SRS can be configured to be transmitted by an activated BPL, so that the SRS experiences the same channel conditions as the uplink activated BPL. In this way, the quality of the activated BPL can be determined more accurately based on the status of the SRS. In this embodiment, the above configuration may be implemented by a quasi-colocation configuration. In an embodiment of the present disclosure, if two signals experience the same channel condition (for example, the same spatial large-scale fading), the two signals may be referred to as being quasi-colocation (QCL). In one embodiment, an electronic device 300 at a base station side can configure the SRS of an electronic device 350 at a terminal device side with the signal communicated through the uplink control channel (for example PUCCH or DMRS accompanying PUCCH) to be quasi-colocation through high-level signaling (for example, RRC layer signaling).

A configuration example of quasi-colocation is described here. An electronic device 300 may set a transmitting beam and a BPL used by an electronic device 350 to transmit the SRS. Referring back to FIG. 2, the transmitting beam 160 (3) of the BPL 130 may correspond to one or more antenna ports 150 (1) to 150 (3), and each antenna port may in turn correspond to one or more groups of SRS resources. If the SRS resource for transmitting the SRS is specified, the transmitting beam and the corresponding BPL for transmitting the SRS may be determined based on the correspondence described above. Therefore, a correspondence may be established between K resources of the N uplink SRS resources and K uplink control signal (for example, PUCCH signal) beams, where N>=K and K may be equal to 1. In one example, the correspondence may be determined in accordance with to a protocol, or reached an agreement by negotiating between the electronic device 300 and the electronic device 350. In this way, the electronic device 300 may insert a resource indicator (for example, SRI, i.e., SRS Resource Indicator) of the SRS into a downlink control channel (for example, a PDCCH) to notify the electronic device 350 of the corresponding transmitting beam and corresponding BPL of the resource.

In some embodiments, by setting a transmitting beam and a BPL used by an electronic device 350 to transmit the SRS, an electronic device 300 can configure the SRS and the uplink control signal to be quasi-colocation, and cause them to be transmitted with the same transmitting beam at a terminal device side. For example, the electronic device 300 may determine the SRS resources based on a transmitting beam of an activated BPL, and notify the electronic device 350 of the corresponding SRI, and then the transmitting beam determined by the electronic device 350 based on the SRI is the same as the transmitting beam of the activated BPL, and the SRS and the uplink control signal are quasi-colocation. In one example, the configuration of quasi-colocation may be notified through downlink control information (for example, DCI, Downlink Control Information) signaling. In other embodiments, by configuring the electronic device 350 to transmit SRS with candidate transmitting beams, the electronic device 300 can track these transmitting beams. At this time, it is necessary to determine the resources of the SRS based on the candidate transmitting beams, and perform corresponding processing such as notification. Refer to the foregoing embodiments for details. In this way, the terminal device 300 can monitor both the activated BPL and the candidate BPL.

Figure 4B:
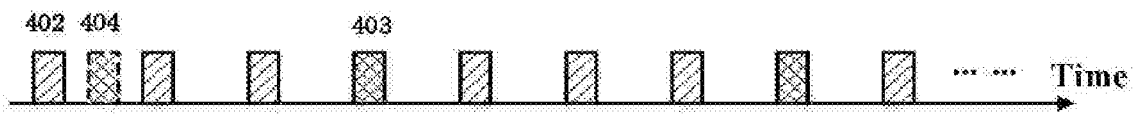
FIG. 4B illustrates a second example of uplink signal transmission according to an embodiment of the present disclosure.

FIG. 4B illustrates a second example of uplink signal transmission according to the present disclosure. In FIG. 4B, the SRSs 402 and 403 may be transmitted by the electronic device 350 at a certain period. The SRS 402 may be transmitted through a transmitting beam of an activated BPL, for an electronic device 300 to monitor the quality of the activated BPL. The SRS 403 may also be transmitted through the candidate transmitting beam, for the electronic device 300 to track the quality of the candidate transmitting beam. In some cases, the transmission frequency of the transmitting beam of the activated BPL may be made higher than the transmission frequency of the candidate transmitting beam. For example, the transmission of transmitting beam of the activated BPL in FIG. 4B is three times the transmission of the candidate transmitting beam in terms of frequency of transmitting. The electronic device 300 may receive the SRSs 402 and 403 and monitor their status, so as to determine the quality of the activated BPL and the candidate transmitting beam based on the monitoring. Here, periodic SRS resources can be configured by the electronic device 300 to the electronic device 350 through RRC signaling.

In one embodiment, the SRSs 402 and 403 in FIG. 4B may also be transmitted aperiodically by the electronic device 350. At this time, the situation is similar to FIG. 4B, but the triggering and resources of aperiodic SRS can be configured by the electronic device 300 to the electronic device 350 through DCI signaling. In some embodiments, the triggering of aperiodic SRS and the configuration of quasi-colocation can be completed through a single DCI signaling in order to save time overhead.

Since aperiodic SRS can be triggered through low-level signaling such as DCI, aperiodic SRS has a certain degree of flexibility. With continued reference to FIG. 4B, in one embodiment, periodic SRS and aperiodic SRS may be used in combination. For example, after receiving the first SRS signal 402, the electronic device 300 determines that the quality of the activated BPL is not good, and the BPL may need to be adjusted. Therefore, the electronic device 300 needs to monitor the quality of the candidate transmitting beam. However, it takes several cycles for the periodic SRS signal 410 transmitted through the candidate transmitting beam to be transmitted. At this time, the electronic device 300 may trigger aperiodic SRS signal 404, and the SRS signal 404 may be transmitted through the candidate transmitting beam. In this way, the electronic device 300 can monitor the quality of the candidate transmitting beam in a shorter time, thereby assisting the adjustment of the BPL.

Figure 4C:
FIG. 4C illustrates a third example of uplink signal transmission according to an embodiment of the present disclosure.

FIG. 4C illustrates a third example of uplink signal transmission according to the present disclosure. On the basis of the examples of FIGS. 4A and 4B, the example of FIG. 4C can simultaneously monitor an activated BPL or a candidate transmitting beam through both a PUCCH signal and an SRS signal, and the specific process is not repeated.

It should be understood that although higher accuracy of estimating the uplink BPL can be obtained by setting the SRS to be transmitted by an activated BPL, in general, the accuracy in estimating the uplink BPL may also be acceptable without conducting above settings for transmission of SRS. Therefore, in one embodiment, the quasi-colocation between the SRS and the uplink control signal is an optional setting.

It should be understood that the embodiments of FIGS. 4A to 4C are merely exemplary. In various other embodiments, the uplink signals are not limited to PUCCH and SRS, but may be appropriate uplink signals in various systems (such as DMRS, NR-PUCCH, NR-SRS, NR-DMRS, etc.). In the embodiments of FIG. 4A to FIG. 4C, the sizes and relative relationships of various frames and spaces are only illustrative, and can be appropriately set according to system requirements.

Uplink Signal Monitoring, BPL Adjustment Determination

In some embodiments, uplink signals may be monitored by a monitoring unit 302. For example, in one embodiment, the monitoring unit 302 can be configured to determine the detection performance of an uplink control signal (for example the received signal-to-noise ratio, etc.) or determine the uplink reference signal received power (RSRP), so as to determine whether corresponding uplink signal can be detected correctly. In some cases, the monitoring unit 302 may also send ACK or NACK feedback to a terminal device regarding the reception of the uplink signal.

Figure 5:
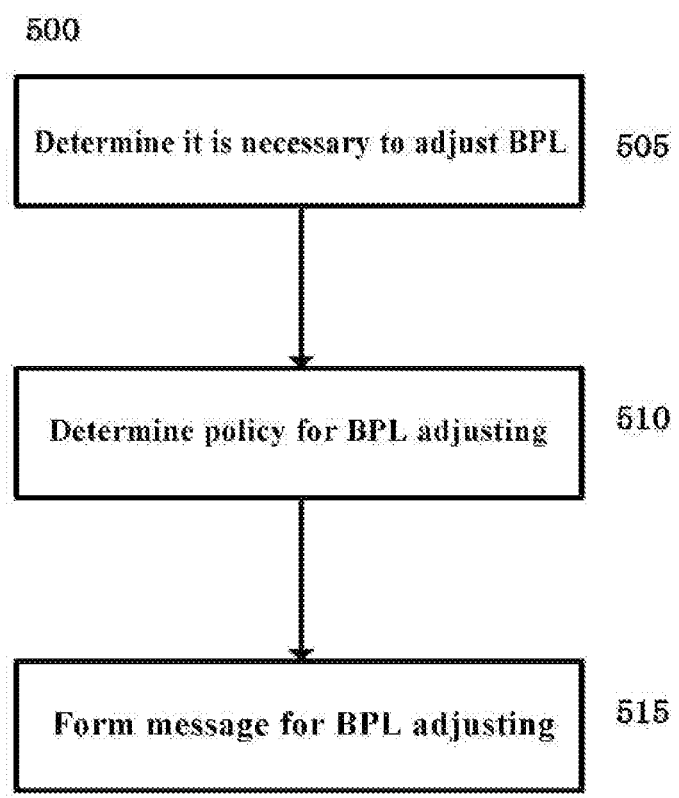
FIG. 5 illustrates an example process of the determination of uplink BPL adjustment according to an embodiment of the present disclosure.

In some embodiments, a determination process related to the BPL adjustment may be performed by the determination unit 304. FIG. 5 illustrates an example process of an uplink BPL adjustment determination according to an embodiment of the present disclosure. Referring to FIG. 5, at 505, it can be determined whether an adjustment is needed for an uplink BPL used for transmitting an uplink signal. In one embodiment, the determination unit 304 may determine that it is necessary to adjust the uplink BPL used for transmitting the uplink control signal if the uplink control signal cannot be detected correctly (or if the situation continues for a predetermined time duration). In one embodiment, the determining unit 304 may determine that it is necessary to adjust the uplink BPL used for transmitting the uplink reference signal if the uplink reference signal received power (RSRP) is below a predetermined threshold (or if the situation continues for a predetermined time duration).

At 510, if the uplink BPL needs to be adjusted, it can be determined how to adjust the uplink BPL, that is, determine policy for adjusting the BPL. The determination of the policy for adjusting the BPL may need to consider uplink beam status. For example, if there exist a plurality of uplink BPLs, it may be determined to cancel the first uplink BPL; if there exist candidate matching transmitting and receiving beams to establish a BPL in the uplink, it may be determined to establish a second uplink BPL based on the candidate matching transmitting and receiving beams; or in some cases, it may be determined to perform uplink beam sweeping. An example of policy for adjusting the BPL will be described in detail below with reference to FIGS. 6A to 6C.

At 515, a message for BPL adjusting may be formed according to the policy for adjusting the BPL. In one embodiment, the message for BPL adjusting can comprise the uplink transmitting beam related to the BPL adjustment. According to system settings, the example form of the message for BPL adjusting may be 1) reflecting the BPL after adjusting, or 2) reflecting the BPL to be adjusted. An example of the message for BPL adjusting will be described in detail below with reference to FIGS. 7A and 7B.

Figure 6A:
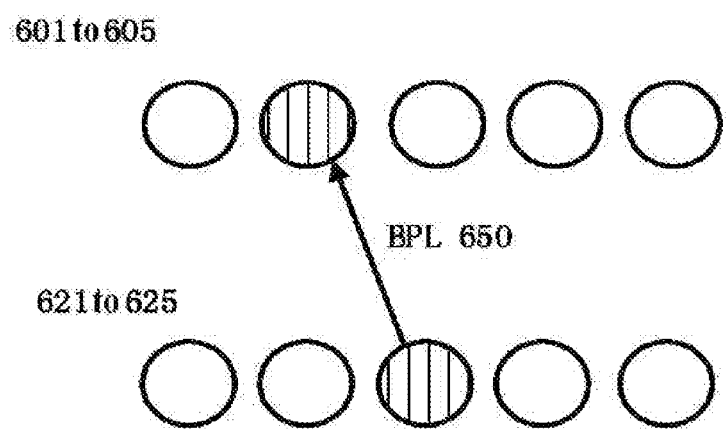
FIGS. 6A to 6C illustrate status of uplink beams according to several examples of embodiments of the present disclosure.
Figure 6B:
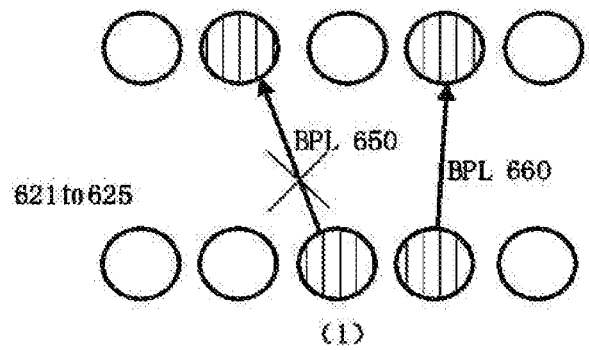
Figure 6B:
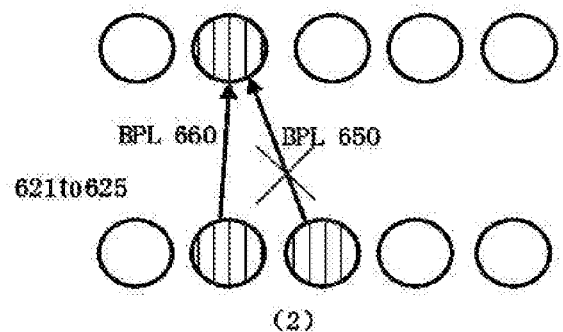
Figure 6B:
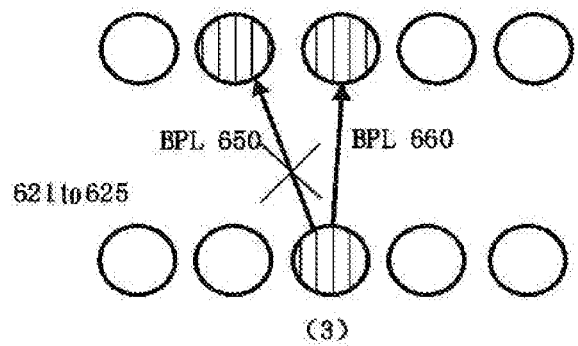
Figure 6C:
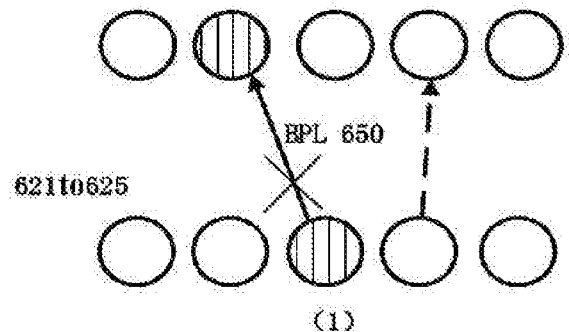
Figure 6C:
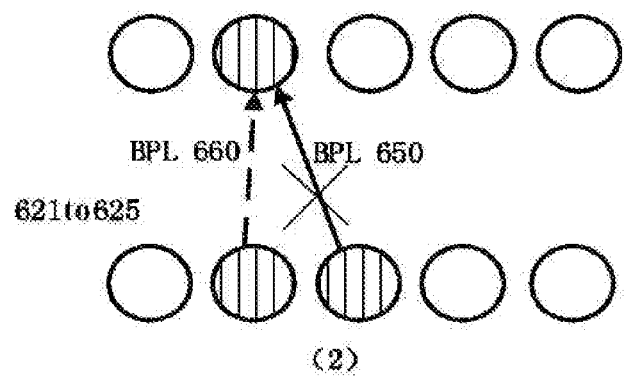
Figure 6C:
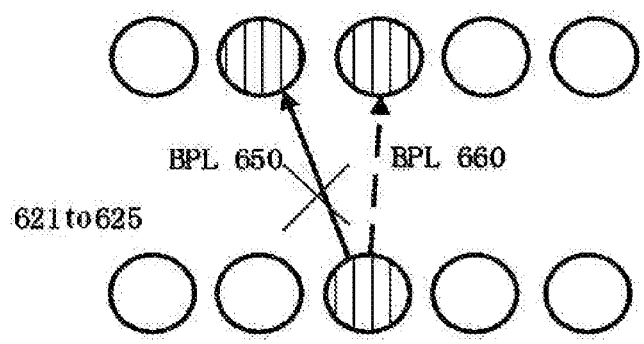

FIGS. 6A to 6C illustrate status of uplink beams according to several examples of embodiments of the present disclosure. An example of determining policy for adjusting the BPL is described below with reference to FIGS. 6A to 6C.

In FIGS. 6A to 6C, a base station side has 5 receiving beams (denoted as 601 to 605), and a terminal device side has 5 transmitting beams (denoted as 621 to 625). In the uplink of FIG. 6A, there is only a single activated BPL between the base station and the terminal device and there is no candidate matching transmitting and receiving beam.

In this case, when it is determined, for example, at 510 that the uplink BPL needs to be adjusted, it may be determined to perform an uplink beam sweeping to re-determine the matching transmitting and receiving beams, thereby establishing a new uplink BPL.

In the uplink of FIG. 6B, there may be a plurality of (for example, 2) activated BPLs between the base station and the terminal device. In situation (1), different transmitting beams (for example, 623 and 624) form separate activated BPLs (for example, 650 and 660) with different receiving beams (for example, 602 and 604). In situation (2), different transmitting beams (for example, 623 and 624) form separate activated BPLs (for example, 650 and 660) with the same receiving beam (for example, 602), which is the situation that the aforementioned receiving beam is overlapped for multiple transmitting beams. In situation (3), the same transmitting beam (for example, 623) forms separate activated BPLs (for example, 650 and 660) with different receiving beams (for example, 602 and 603), which is the situation that the aforementioned transmitting beam is overlapped for multiple receiving beams. In these cases, when the BPL 650 is determined to be failed, for example at 510, and therefore the uplink BPL needs to be adjusted, the BPL 650 may first be determined to be cancelled. At this time, before a new uplink BPL is established, communication can be performed through other existing BPLs (for example, BPL 660). At the same time or after determining the cancellation of BPL 650, it is also possible to try to establish a new BPL through other matching transmitting and receiving beams.

In the uplink of FIG. 6C, there may be one or more activated BPLs (for example, 650) and one or more matched standby transmitting and receiving beams (which can be used to establish standby BPL (for example, 660, as shown by the dotted line)) simultaneously between a base station and a terminal device. In situation (1), both transmitting and receiving beams do not overlap between the activated BPL 650 and the standby BPL 660. In situation (2), the receiving beams are overlapped between the activated BPL 650 and the standby BPL 660 (both are receiving beams 602), which is the situation the aforementioned receiving beams are overlapped for multiple transmitting beams. In situation (3), the transmitting beams are overlapped between the activated BPL 650 and the standby BPL 660 (both are transmitted beams 623), which is the situation the aforementioned transmitting beams are overlapped for multiple receiving beams. In these cases, when it is determined, for example, at 510 that the one or more activated BPLs (for example, BPL 650) are failed and therefore the uplink BPL needs to be adjusted, since there is a candidate uplink BPL at this time, the BPL 650 can be determined to be cancelled and a new uplink BPL can be established based on candidate paired transmitting and receiving beams (for example, 624 and 604, 623 and 602, and 623 and 602).

In addition to the situations shown in FIGS. 6A to 6C, there may be other situations where multiple activated BPLs and/or candidate transmitting and receiving beams coexist (for example, the number of activated BPLs and candidate transmitting and receiving beams may be different in different situations). Those skilled in the art can conceive alternative forms for determining policy for adjusting the BPL without departing from the teachings of this disclosure, and these still fall within the scope of this disclosure.

FIG. 7A illustrates an example message for BPL adjusting reflecting an adjusted BPL according to an embodiment of the present disclosure. In FIG. 7A, the message for BPL adjusting 700 has information (for example, TX_Beam IDs 1 to 3) of a transmitting beam to be used after being adjusted by the policy for adjusting the BPL. Taking the three situation in FIG. 6C as examples, TX_Beam IDs 1 to 3 in the corresponding message for BPL adjusting may correspond to the identification information of the transmitting beams 624, 622, and 623, respectively. It should be noted that, in the situation (3) of FIG. 6C, the transmitting beams before and after the BPL adjustment are the same, both being 623. At this time, the BPL adjustment only involves the adjustment of the receiving beam at the base station side, and does not require the terminal device to adjust the transmitting beam. Therefore, in one embodiment, in this situation, the message for BPL adjusting may not be formed or sent.

FIG. 7B illustrates an example message for BPL adjusting reflecting a BPL to be adjusted according to an embodiment of the present disclosure. In FIG. 7B, the message for BPL adjusting 720 has information (for example, TX_Beam IDs 1 to 3) of transmitting beams to be adjusted by policy for adjusting the BPL and information on how to adjust these transmitting beams. For example, bit "1" may indicate that an uplink BPL is established using the transmitting beam, and bit "0" may indicate that the uplink BPL corresponding to the transmitting beam is cancelled. In FIG. 7B, there may be multiple such bits for individual transmitting beams, respectively. In other examples, there may be a single such bit for all transmitting beams. In the three situations in FIG. 6C, the message for BPL adjusting may be identification information of the transmitting beam 623+"0"+identification information of the transmitting beam 624+"1", identification information of the transmitting beam 623+"0"+ identification information of the transmitting beam 622+"1" and identification information of the transmitting beam 623+"1". It should be noted that, in the situation (3) of FIG. 6C, the transmitting beams of the BPL 650 to be cancelled and the BPL 660 to be established overlap. Because the result of the BPL adjustment is to still use the transmitting beam 623, the message for BPL adjusting would not include such information as the identification information of the transmitting beam 623+"0", corresponding to the BPL 650.

In one embodiment, in addition to uplink transmitting beams related to the BPL adjustment, the message for BPL adjusting may further include a time for adjusting. The time for adjusting may indicate the time that a base station expects a terminal device to complete the BPL adjustment. In one example, the time for adjusting may be in units of subframes. The time for adjusting of m may indicate that a base station expects a terminal device to complete the BPL adjustment in the m-th subframe after the current subframe. It should be understood that when m=0, the time for adjusting may indicate that a base station expects a terminal device to complete the BPL adjustment in the current subframe.

In the example message for BPL adjusting shown in FIGS. 7A and 7B, the corresponding uplink BPL is indicated by beam information (for example, TX_Beam IDs 1 to 3 at the terminal device side). However, in an embodiment of the present disclosure, the manner of indicating the BPL may not be limited to this. For example, the corresponding BPL may be indicated by tagging each BPL. In one embodiment, the tag added for the uplink BPL may be based on the beam at the base station side (receiving beam). In another embodiment, the tag added for the uplink BPL may be based on the beam at terminal device side (transmitting beam). In yet another embodiment, the tag added for the uplink BPL may be based only on a certain order, for example based on the order the BPL is established. Although the following describes the embodiment with adding tags mainly in conjunction with the uplink BPL, it can be understood that the tagging method is also applicable to the downlink BPL.

Figure 7C:
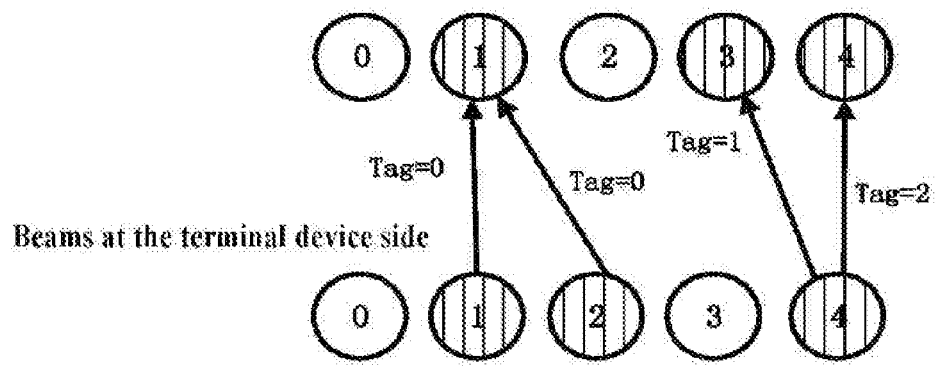
FIGS. 7C to 7E illustrate an example manner of indicating a BPL according to an embodiment of the present disclosure.
Figure 7D:
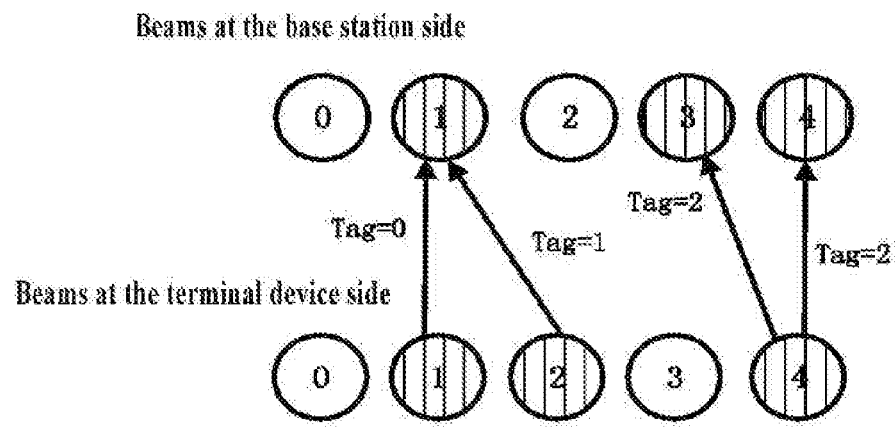
Figure 7E:
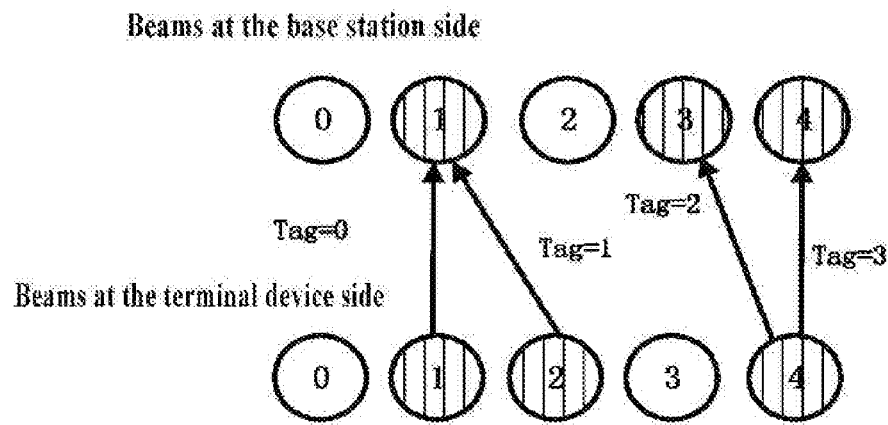

FIGS. 7C to 7E show examples related to the embodiments described above, respectively. In FIGS. 7C to 7E, the transmitting beams "1" and "2" at the terminal device side respectively form one uplink BPL with the receiving beam "1" at the base station side, (that is, the situation that the receiving beam overlaps for the transmitting beams), and the transmitting beam "4" at the terminal device side forms one uplink BPL with the receiving beams "3" and "4" at the base station side respectively (that is, the situation that the transmitting beam overlaps for the receiving beams). In FIG. 7C, the uplink BPL is tagged based on the beam at the base station side. BPLs with the same beam at the base station side can be tagged with the same tag. Specifically, two BPLs formed by the base station side beam "1" may be tagged with the same tag, for example, tag=0. Two BPLs formed by the base station side beams "3" and "4" may be tagged respectively, for example, tag=1 and tag=2. The result of such tagging is shown in the tag mapping table in FIG. 7C.

In FIG. 7D, the uplink BPL is tagged based on the beam at the terminal device side. BPLs with the same beam at the terminal device side can be tagged with same tag. Specifically, two BPLs formed by the terminal device side beam "4" may be tagged with the same tag, for example, tag=2. Two BPLs formed by the terminal device side beams "1" and "2" can be tagged respectively, for example, tag=0 and tag=1. The result of such tagging is shown in the tag mapping table in FIG. 7D.

In FIG. 7E, the uplink BPL is tagged based on a certain order (for example, the BPL establishment order). Specifically, assuming that the four BPLs in FIG. 7E are sequentially established from left to right, they can be tagged with 1 to 4 respectively. The result of such tagging is shown in the tag mapping table in FIG. 7E.

In a wireless communication system, the base station side and the terminal device side can generate tag mappings in accordance with the manner described above and can maintain corresponding tag mapping tables. This enables to indicate BPLs between a base station and a terminal device through BPL tags, and to obtain the corresponding transmitting and/or receiving beams by searching, for example, tables, to perform operations such as adjustment and the like. One advantage of this method is that it can save the signaling overhead of indicating the BPL, because the number of BPLs established is generally less than the number of beams, and indicating the BPL through tags can save bit overhead compared to using beam identification information. In the examples of FIGS. 7C and 7D, the advantage is more significant in this respect. Taking FIG. 7C as an example, indication of BPL by the beam identification information needs 3 bits, while with tagging method, 2 bits are needed. In other cases, the saved bit overhead may be much more significant. This overhead saving is significant for relatively frequent low-level signaling such as DCI. The example of FIG. 7E may have an additional advantage, that is, in a case where there is an overlap of transmitting or receiving beams, the corresponding transmitting and receiving beams may be determined through the BPL tags, thereby distinguishing BPLs.

It should be understood that those skilled in the art can conceive alternative forms of message for BPL adjusting without departing from the teachings of the present disclosure, and those still fall within the scope of the present disclosure.

Performing of BPL Adjustment

According to an embodiment of the present disclosure, after an electronic device 300 at a base station side makes determination of an uplink BPL adjustment and forms the policy for adjusting the BPL, the electronic device 300 may perform the BPL adjustment alone or together with an electronic device at the terminal device side.

In some embodiments, when the BPL adjustment does not involve the operation of the electronic device 350 (such as described above in connection with situation (3) of FIG. 6C), the electronic device 300 can be configured (for example, via the operation unit 306) to perform BPL adjustments at the appropriate time. For example, the electronic device 300 may immediately adjust the receiving beam.

In some embodiments, when the BPL adjustment involves the operation of the electronic device 350 or whatever the BPL adjustment involves the operation of the electronic device 350, the electronic device 300 can be configured (for example, via the operation unit 306) to, after a message for BPL adjusting is formed, indicate the message for BPL adjusting to a terminal device (for example, the electronic device 350). In some embodiments, it may be useful to still transmit a message for BPL adjusting to a terminal device even if the BPL adjustment does not involve the operation of the electronic device 350, for example, to assist in tracking the downlink BPL, as described in detail below. Generally, the operating unit 306 may transmit the message for BPL adjusting to the electronic device 350 through the currently activated downlink BPL, and may perform the corresponding BPL adjustment based on policy for adjusting the BPL (or also considering the feedback from the electronic device 350 on the message for BPL adjusting).

Accordingly, the receiving unit 356 of the electronic device 350 may receive the message for BPL adjusting through the currently activated downlink BPL. After the message for BPL adjusting is processed by the electronic device 350 (for example, via the receiving unit 356), the electronic device 350 may transmit ACK or NACK feedback information to the electronic device 300. For example, if the message for BPL adjusting is received correctly, the electronic device 350 may transmit ACK feedback to the electronic device 300 and perform the corresponding BPL adjustment based on policy for adjusting the BPL; otherwise, transmit a NACK feedback and wait for the electronic device 300 to retransmit the message for BPL adjusting.

In some embodiments, the electronic device 350 performing the corresponding BPL adjustment based on policy for adjusting the BPL can comprise the following situations, for example. In one embodiment, the electronic device 350 can be configured to, if the message for adjusting indicates to cancel the first uplink BPL, not to transmit with the first transmitting beam at the terminal device side from the time for adjusting or a specific time on, and to transmit to the base station feedback on the message for adjusting. Further, the feedback comprises a time for adjusting or a specific time. In one embodiment, the electronic device 350 can be configured to, if the message for adjusting indicates to establish a second uplink BPL based on candidate uplink paired beams, transmit with the second transmitting beam at the terminal device side from the time for adjusting or a specific time on, and transmit to the base station feedback on the message for adjusting. Further, the feedback comprises the time for adjusting or the specific time. In one embodiment, the electronic device 350 can be configured to perform uplink beam sweeping if the message for BPL adjusting indicates to perform uplink beam sweeping.

In one embodiment, the above feedback information may be transmitted by the electronic device 350 through the currently activated uplink BPL. Generally, in operation 505, for example, it is determined that the threshold level depend on which the BPL needs to be adjusted is not very low. Therefore, when making a determination for adjustment, the currently activated BPL can still be used to transmit the feedback information. In this way, the electronic device 300 may know as early as possible that the message for BPL adjusting is transmitted successfully, and may not retransmit, thereby saving downlink transmission resources. In another embodiment, additionally or alternatively, the feedback information may also be transmitted through the adjusted activated BPL. In a case where the feedback information fails to be transmitted through previous activated BPL, this approach may help the electronic device 300 successfully receive the feedback information. In a further embodiment, after acquiring the content of the message for BPL adjusting, the electronic device 350 can be configured to determine the time for adjusting, n, of the BPL (which may similarly indicate the nth subframe after the current subframe), and complete the BPL adjustment in the time for adjusting. In one embodiment, the n value may be equal to or not equal to the foregoing m value (for example, n>m). The electronic device 350 may determine the m value based on the situation of the electronic device 350, and include the m value in the feedback information ACK and transmitted to the electronic device 300 together. With such negotiation method, the electronic device 300 can complete the uplink BPL adjustment at the time indicated by the value of m.

Figure 8A:
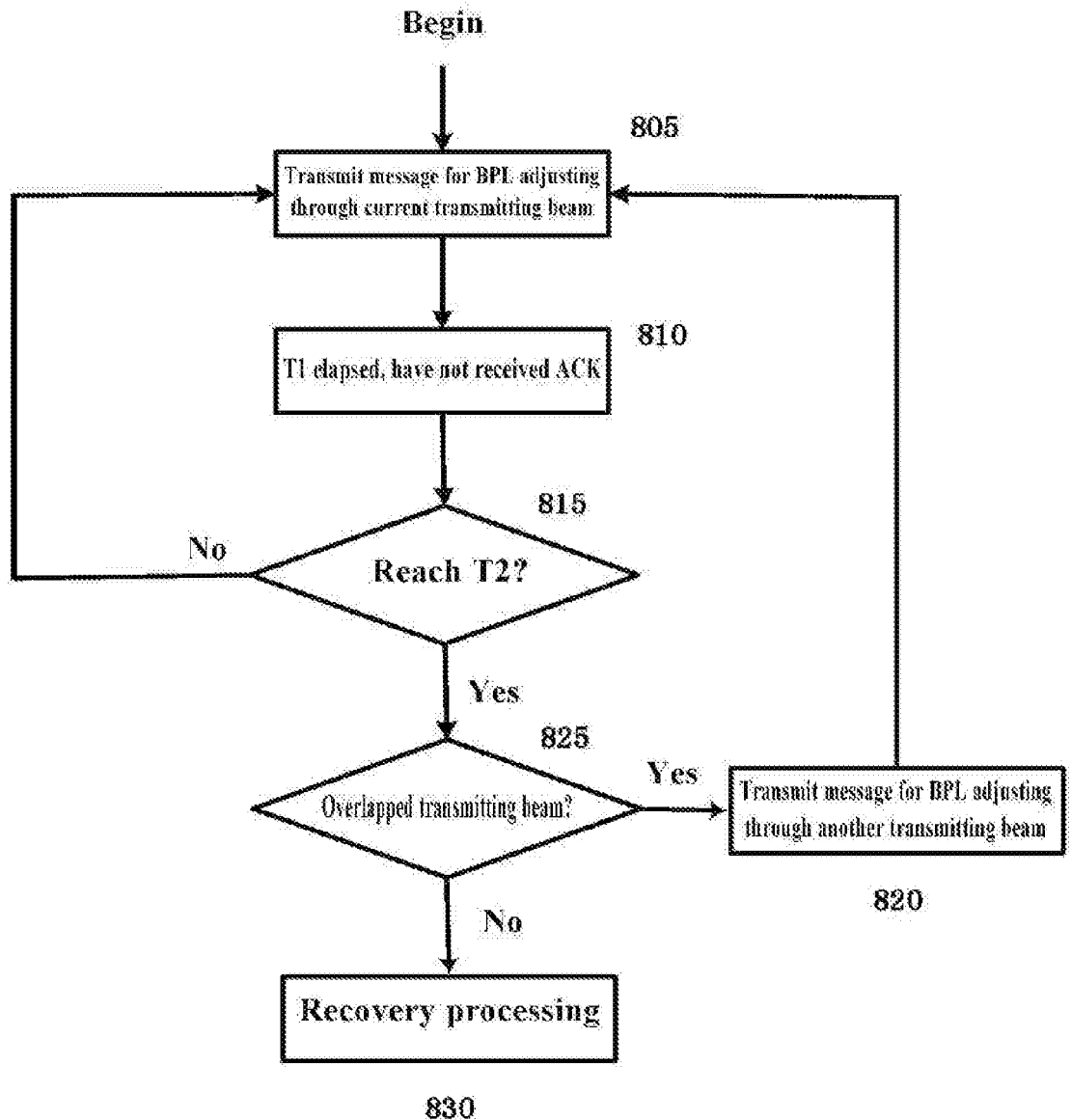
FIGS. 8A and 8B illustrate an example operation at a base station side according to an embodiment of the present disclosure.
Figure 8B:
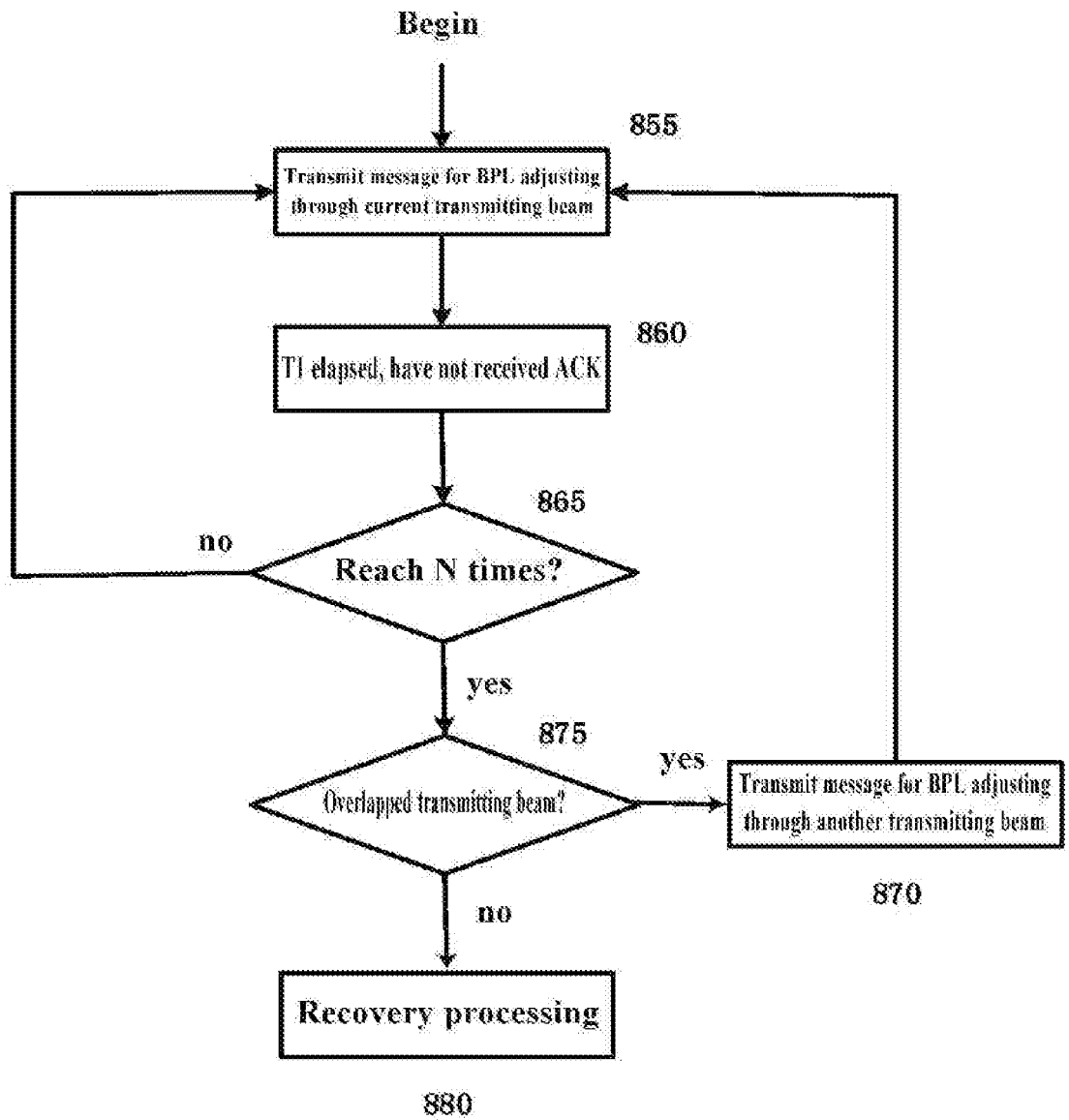

In some embodiments, when the electronic device 300 receives the ACK feedback information, it may perform BPL adjustment (for example, at the negotiation time described above). When receiving the NACK feedback information, the electronic device 300 may perform HARQ retransmission on the message for BPL adjusting. In some cases, the electronic device 300 may still not receive any feedback information after a reasonable waiting time (the reasonable time may be based on the HARQ retransmission interval and/or the number of allowed retransmissions, for example). At this time, the BPL of the downlink may need to be replaced and adjusted. For example, the electronic device may first transmit a BPL adjustment command through a transmitting beam of a first downlink BPL. If the electronic device 300 does not receive a response to the adjustment command from the terminal device after a given time or after transmitting through the first downlink BPL for a given number of times, the electronic device 300 may change or adjust to the second downlink BPL to retransmit an adjustment command. In one embodiment, the first downlink BPL and the second downlink BPL may be receiving beams overlapped. In addition, when the electronic device 300 cannot receive any feedback information, a recovery mechanism may also need to be triggered to ensure that communication continues. FIGS. 8A and 8B illustrate example operations related to this aspect of an electronic device 300 according to an embodiment of the present disclosure.

Figure 8C:
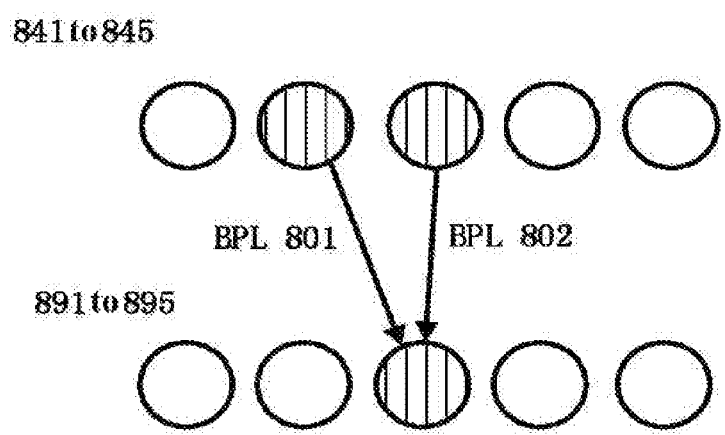
FIG. 8C illustrates an example of a downlink BPL according to an embodiment of the present disclosure.

At the beginning of FIG. 8A, the electronic device 300 may determine to transmit a message for adjusting of an uplink BPL through a first downlink BPL (for example, the downlink BPL 801 in FIG. 8C). At 805, the electronic device 300 may transmit the message for BPL adjusting through the BPL 801. It should be noted that FIG. 8C is an example of a downlink BPL according to an embodiment of the present disclosure. In FIG. 8C, two transmitting beams 842 and 843 at a base station side form separate activated BPLs 801 and 802 with the same receiving beam 893 at a terminal device side, that is, receiving beams between different BPLs are overlapped. In some embodiments, BPL 802 may only be a candidate downlink BPL and does not have to be activated. Returning to FIG. 8A, at 810, the HARQ retransmission interval time T1 has elapsed and the electronic device 300 has not received an ACK feedback. At this time, it can be determined at 815 whether time T2 has elapsed, and T2 is a reasonable time determined in consideration of the retransmission interval time T1 and the number of HARQ retransmissions N (for example, it may be T1×N or slightly larger). If it is determined NO at 815, return back to 805, where the message for BPL adjusting is retransmitted through BPL 801. Otherwise, proceed to 825 to determine whether there is another transmitting beam overlapping with the transmitting beam 842 for the receiving beam 893 of the BPL 801. If it is determined YES (for example, the transmitting beam 843 in FIG. 6C), the message for BPL adjusting may be transmitted through the downlink BPL 802 formed by the transmitting beam 843 and the receiving beam 893. After that, return back to 805 and repeat the above process. If the determination is NO at 825, a recovery process, for example a downlink beam sweeping or a forwarding operation through dual connectivity, may be triggered at 830, as described in detail below.

FIG. 8B shows another example. At the beginning of FIG. 8B, an electronic device 300 may similarly determine to transmit a message for adjusting of an uplink BPL through a downlink BPL 801 in FIG. 8C. At 855, the electronic device 300 may transmit the message for BPL adjusting through the BPL 801. At 860, the HARQ retransmission interval time T1 has elapsed and the electronic device 300 has not received an ACK feedback. At this time, it can be determined at 865 whether the message for BPL adjusting is transmitted for HARQ retransmission times N. If it is determined NO at 865, return back to 855, where the message for BPL adjusting is retransmitted through the BPL 801. Otherwise, proceed to 875 to determine whether there is another transmitting beam overlapping with the transmitting beam 842 for the receiving beam 893 of the BPL 801. If it is determined YES (for example, the transmitting beam 843 in FIG. 6C), the message for BPL adjusting may be transmitted through the downlink BPL 802 formed by the transmitting beam 843 and the receiving beam 893. After that, return back to 855 and repeat the above process. If the determination is NO at 875, the recovery process may be triggered at 880. In some examples, the examples of FIGS. 8A and 8B may be used in combination.

In an embodiment of the present disclosure, one function of the electronic device 350 transmitting the feedback information on the message for BPL adjusting is that it can assist the electronic device 300 to track the status of the downlink BPL. This is because the electronic device 300 being able to receive feedback information (whether ACK or NACK, as described with reference to FIGS. 8A and 8B) may indicate that the electronic device 350 must have received the adjustment information in the downlink. Otherwise, to a certain extent, it may indicate that the electronic device 350 may not have received the adjustment information in the downlink, and the downlink BPL may have failed. In this way, the electronic device 300 can properly adjust the downlink BPL without receiving the feedback message.

In an embodiment of the present disclosure, in a case where the matched transmitting beam and receiving beam in an uplink correspond to (for example, are same as) the matched receiving beam and transmitting beam in a downlink, the uplink and downlink are of beam symmetry. In some embodiments, beam symmetry information may be utilized to assist in adjusting a downlink BPL. For example, in the case of beam symmetry, when the electronic device 300 (for example, via the determining unit 304) determines that a first BPL (and the corresponding first transmitting beam and receiving beam) needs to be adjusted, the determining unit 304 may determine that the BPL is of poor quality also in the downlink direction and may need to be adjusted. In this way, the electronic device 300 (for example, via the operation unit 306) can transmit an adjustment command through a second BPL (and the corresponding second transmitting beam). In some embodiments, this operation that satisfies beam symmetry can be used in conjunction with the examples of FIGS. 8A and 8B.

BPL Recovery

Recovery Process Initiated by a Terminal Device

Figure 9A:
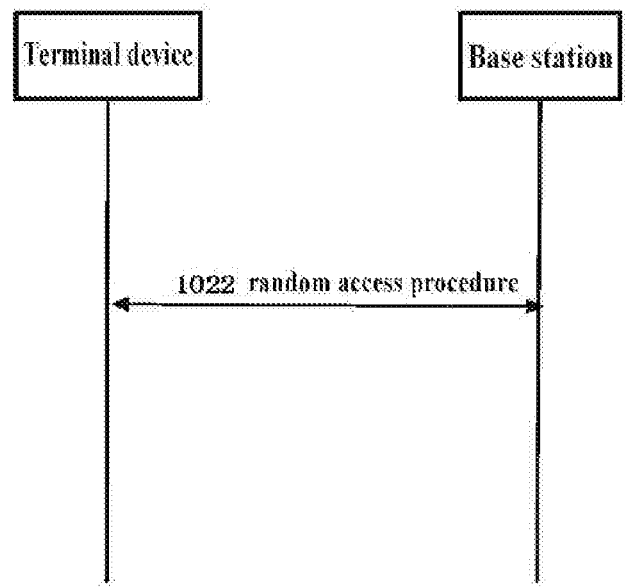
FIG. 9A illustrates an example signaling flow for a recovery process initiated by a terminal device side according to an embodiment of the present disclosure.

In some cases, an electronic device 350 at a terminal device side may determine that an uplink BPL has failed and initiate an uplink recovery process. In one embodiment, the electronic device 350 receives multiple identical messages for adjusting within a given time, for example, the given time here may be greater than the normal transmitting time for a single message for adjusting. At this time, the electronic device 350 may determine that an electronic device 300 at a base station side still transmits a downlink BPL after the normal transmission time for the single message for adjusting, which may be because the electronic device 300 does not receive feedback information on the message for adjusting, that is, the uplink BPL has failed. In this case, the electronic device 350 may restore the uplink BPL, for example, by performing a random access procedure. FIG. 9A illustrates an example signaling flow for a recovery process initiated at a terminal device side. When a terminal device determines that a downlink BPL has failed, the uplink BPL may be re-established through the random access procedure. Specifically, at 1022, the terminal device may initiate the random access procedure.

Recovery Process Initiated by a Base Station

In some embodiments, after transmitting BPL adjustment information using, for example, an activated and a candidate downlink BPL, if the feedback information on the BPL adjustment information is still not received (for example, after transmitting BPL adjustment information for a given number of times and/or after a given time), an electronic device 300 at the base station side may transmit a BPL adjustment command through a recovery process, as described in the following example.

Figure 9B:
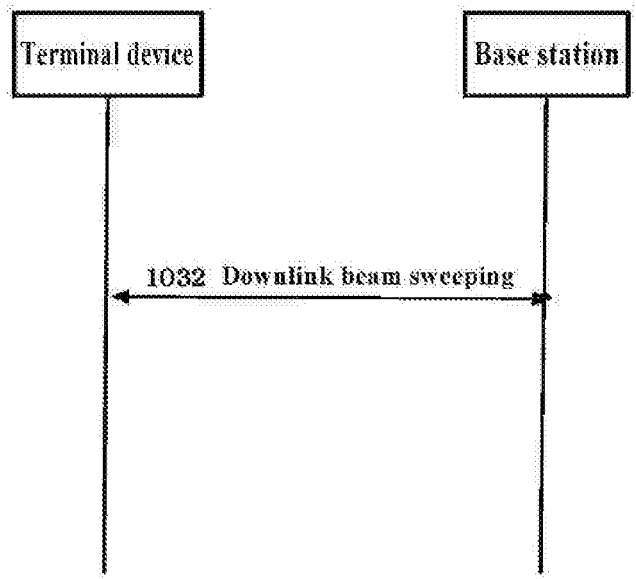
FIG. 9B illustrates a first example signaling flow for a recovery process initiated by a base station side according to an embodiment of the present disclosure.

In one embodiment, the electronic device 300 may re-establish a downlink BPL through a downlink reference signal beam sweeping, thereby transmitting a BPL adjustment command through the new downlink BPL. FIG. 9B illustrates a first example signaling flow for a recovery process initiated at a base station side. When the base station determines that the downlink BPL has failed, the downlink BPL may be re-established through a downlink beam sweeping process. Specifically, at 1032, the base station may initiate a downlink beam sweeping process with a terminal device.

In another embodiment, the electronic device 300 may indicate a message for BPL adjusting to an electronic device 350 at a terminal device side in a dual connectivity (Dual Connectivity) manner.

Dual Connectivity is a technology that enables terminal devices to communicate with a plurality of base stations so as to increase data rates. For example, a terminal device may maintain a connection with both a first base station and a second base station. In the process of communication between the first base station and the terminal device, the second base station may be added to form a dual connectivity as desired (for example, a desire to increase the data rate), and then the first base station becomes the master node and the second base station becomes the secondary node. In some cases, the master node may be an eNB (for example a Master eNB) in an LTE system, and the secondary base station may be a corresponding node in a 5G system, for example a gNB (for example a Secondary gNB) in an NR system. The opposite can also apply. In some embodiments, the first base station may not be limited to an eNB, and the second base station may not be limited to a gNB. For example, the first base station and the second base station may be any base stations belonging to the same wireless communication system or to different wireless communication systems. Transmitting a message for adjusting to a terminal device in a dual connectivity manner can comprise passing the message for adjusting to another base station serving the electronic device 350 together through the dual connectivity, and the message for adjusting may be indicated to the electronic device 350 by the other base station. Refer to the following signaling flow description for specific operations.

Figure 9C:
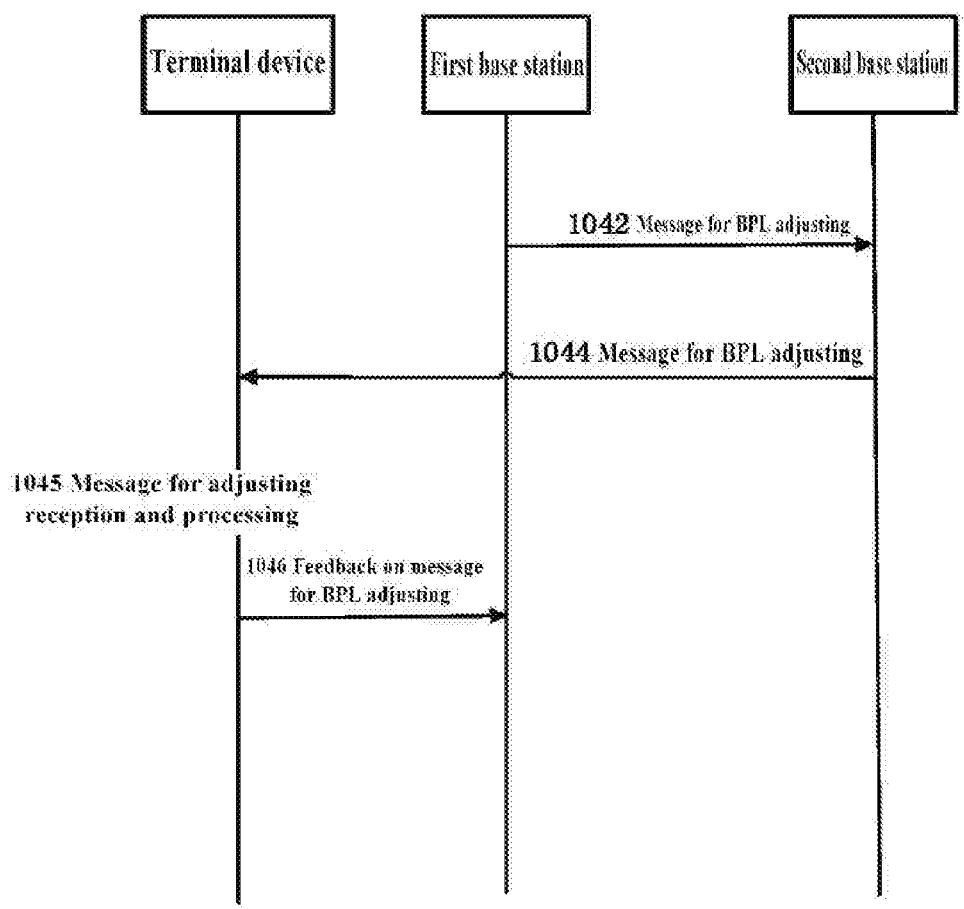
FIG. 9C shows a second example signaling flow for a recovery process initiated by a base station side according to an embodiment of the present disclosure.

FIG. 9C shows a second example signaling flow for a recovery process initiated at a base station side. When a first base station determines that a downlink BPL has failed, a second base station serving a terminal device with the first base station in a dual connectivity manner may transmit a message for uplink BPL adjusting to the terminal device. Specifically, at 1042, the first base station may transmit the message for BPL adjusting to the second base station. In an example where the first base station is implemented as a gNB and the second base station is implemented as an eNB, the gNB transmits backhaul signaling including the message for BPL adjusting to the eNB through the Xx interface; in an example where the first base station is implemented as a gNB and the second base station is implemented as another gNB, the first base station transmits backhaul signaling including the message for BPL adjusting to the second base station through the Xn interface. At 1044, the second base station may forward the message for BPL adjusting to the terminal device. Preferably, the second base station corresponds to a master node implemented with an eNB, so that it can serve a larger coverage area and may provide beam management support between the gNB and the terminal device for multiple gNBs within its coverage area. At 1046, after receiving and corresponding processing, the terminal device may transmit feedback information on the message for BPL adjusting to the first base station. The example of assisting the recovery of the BPL through the dual connectivity manner can improve the recovery efficiency of the BPL and reduce the communication interruption time.

It should be understood that FIGS. 9A to 9C are just a few examples of recovery processing. Those skilled in the art can conceive alternative forms of recovery processing without departing from the teachings of this disclosure, and these still fall within the scope of this disclosure.

Self-Contained Subframe

Figure 10:
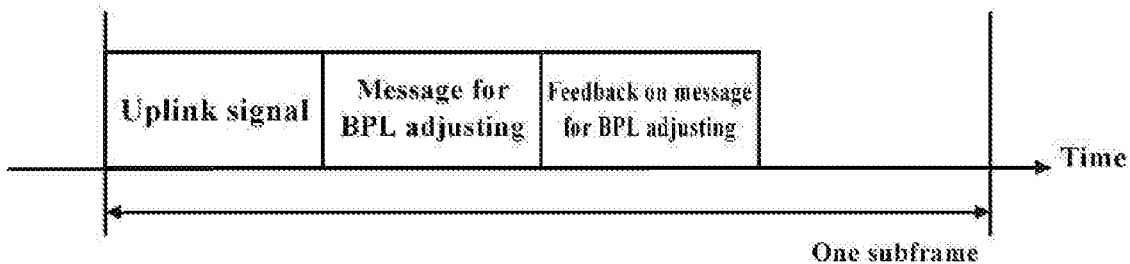
FIG. 10 illustrates an example subframe according to an embodiment of the present disclosure.

In the foregoing embodiment, the message for BPL adjusting can comprise a time for adjusting, and the time for adjusting may indicate, for example, that the base station expects the terminal device to complete the BPL adjustment in the m-th subframe after the current subframe. When m=0, the time for adjusting may indicate that the base station expects the terminal device to complete the BPL adjustment in the current subframe in order to quickly recover the BPL. In order to quickly recover the BPL, in one embodiment, the uplink signal transmission/monitoring, the message for BPL adjusting transmission/reception, and transmission/reception of the feedback on the message for adjusting may be completed in the same subframe. FIG. 10 illustrates one example subframe in this case, and the uplink signal, the message for BPL adjusting, and the feedback on the message for BPL adjusting are all included in this subframe. In some embodiments, such a subframe may be referred to as a self-contained subframe. In another embodiment, uplink signal transmission/monitoring and message for BPL adjusting transmission/reception can be completed in the same subframe. In this example, both the uplink signal and the message for BPL adjusting are included in the subframe. In some embodiments, such a subframe may also be referred to as a self-contained subframe.

It should be understood that the use of a self-contained subframe needs to meet certain conditions, that is, the subframe is a subframe in which a terminal device transmits a sounding reference signal (for example SRS), where the sounding reference signal may be periodic or aperiodic. Generally, the priority of beam adjustment is higher than that of other services. Therefore, in this subframe, the downlink channel and the uplink channel that collide with the information about beam adjustment (for example message for BPL adjusting and feedback to message for BPL adjusting) should avoid these information about beam adjustment.

Exemplary Methods

Figure 11A:
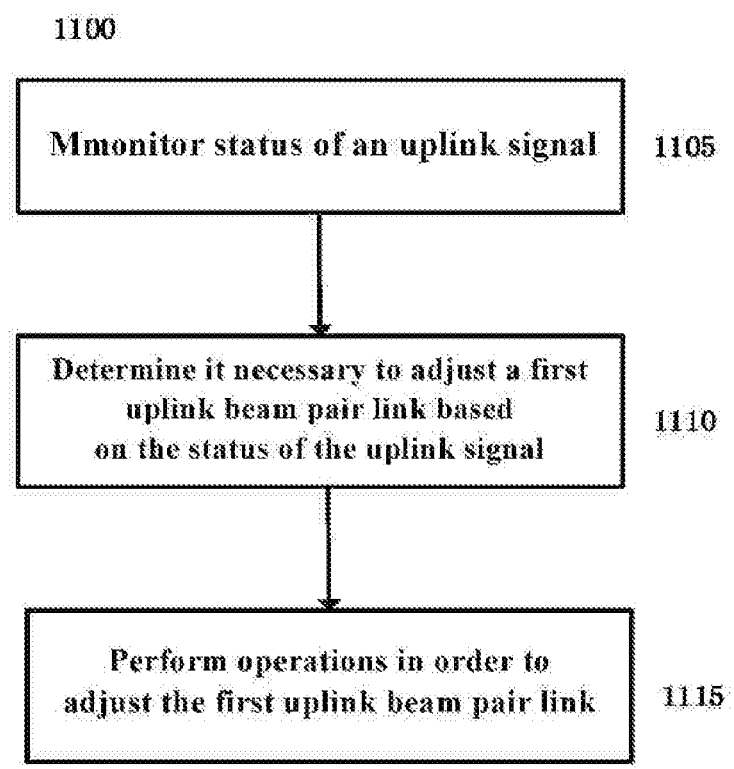
FIGS. 11A and 11B illustrate an example method for communication according to an embodiment of the present disclosure.

FIG. 11A illustrates an example method for communication according to an embodiment of the present disclosure. As shown in FIG. 11A, the method 1100 can comprise monitoring status of an uplink signal (block 1105), determining it necessary to adjust a first uplink beam pair link based on the status of the uplink signal, wherein the first uplink beam pair link comprises a first transmitting beam at a terminal device side and a first receiving beam at the base station side (block 1110). The method 1100 may further include performing operations in order to adjust the first uplink BPL (block 1115). The method may be executed by the electronic device 300. For detailed example operations of the method, reference may be made to the above description of the operations and functions of the electronic device 300, which is briefly described below.

In one embodiment, the operation performed to adjust the first uplink beam pair link comprises at least one of: adjusting the first receiving beam at the base station side; and transmitting to the terminal device a message for adjusting which message indicates adjustment to the first uplink beam pair link.

In one embodiment, the uplink signal comprises at least one of an uplink control signal or an uplink reference signal, and the method may further comprise: determining it necessary to adjust the first uplink BPL if the uplink control signal cannot be correctly detected; and/or determining it necessary to adjust the first uplink BPL if the reference signal received power is below a predetermined threshold.

In one embodiment, the method may further comprise: determining it necessary to adjust the first uplink BPL if the uplink control signal cannot be correctly detected for a predetermined time duration; and/or determining it necessary to adjust the first uplink BPL if the reference signal received power is below a predetermined threshold for a predetermined time duration.

In one embodiment, the uplink reference signal and the uplink control signal are Quasi-colocation, and are transmitted with the first transmitting beam at the terminal device side.

In one embodiment, the method may further comprise determining policy for adjusting the uplink BPL based on uplink beam status and by at least one of the following operations: determining to cancel the first uplink BPL if there exist a plurality of activated uplink BPLs; determining to establish a second uplink BPL based on candidate uplink paired beams if there exist candidate uplink paired beams; or otherwise, determining to perform uplink beam sweeping.

In one embodiment, the message for adjusting comprises the uplink transmitting beam related to the adjustment, or comprises the uplink transmitting beam related to the adjustment and time for adjusting.

In one embodiment, the method may further comprise: transmitting the message for adjusting with a second transmitting beam at the BS side if feedback on the message for adjusting is not received from the terminal device after the message for adjusting is transmitted with the first transmitting beam at the BS side for given times or after a given time, wherein both the first and second transmitting beams at the BS side are paired with a same receiving beam at the terminal device side; and/or altering the transmitting beam at the BS side to transmit the message for adjusting if there is uplink and downlink beams correspondence.

In one embodiment, the method may further comprise: transmitting the message for adjusting by at least one of the following if feedback on the message for adjusting is not received from the terminal device after the message for adjusting is transmitted with the first transmitting beam at the BS side for given times or after a given time: re-establishing a downlink BPL through beam sweeping of a downlink reference signal, so as to transmit the message for adjusting; and transmitting to the terminal device the message for adjusting by way of dual connectivity.

In one embodiment, transmitting to the terminal device the message for adjusting by way of dual connectivity comprises delivering the message for adjusting to another BS which serves the terminal device through dual connectivity, and the message for adjusting is indicated to the terminal device by the other BS.

In one embodiment, the method may further comprise: completing within a same subframe the monitoring the uplink signal, transmitting the message for adjusting and receiving feedback to the message for adjusting; or, completing within a same subframe the monitoring the uplink signal and transmitting the message for adjusting.

Figure 11B:
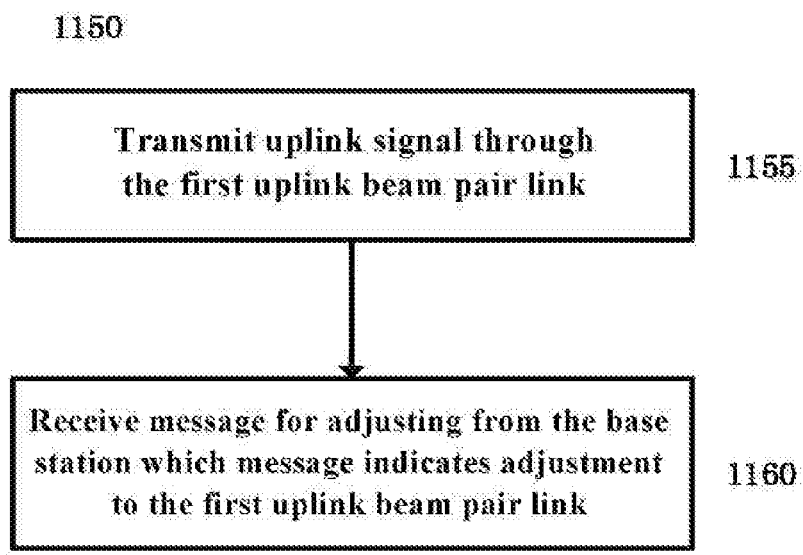

FIG. 11B illustrates another example method for communication according to an embodiment of the present disclosure. As shown in FIG. 11B, the method 1150 can comprise transmitting an uplink signal through a first uplink beam pair link (BPL), wherein the first uplink BPL comprises a first transmitting beam at the terminal device side and a first receiving beam at a base station (BS) side (block 1255). The method 1150 may further comprise receiving a message for adjusting from the BS which message indicates adjustment to the first uplink BPL (block 1260). The method may be executed by the electronic device 350. For detailed example operations of the method, reference may be made to the above description of the operations and functions of the electronic device 350, which is briefly described below.

In one embodiment, the message for adjusting comprises the uplink transmitting beam related to the adjustment, or comprises the uplink transmitting beam related to the adjustment and time for adjusting.

In one embodiment, the uplink signal comprises at least one of an uplink control signal or an uplink reference signal, the uplink control signal, if cannot be correctly detected, causes the BS to determine it necessary to adjust the first uplink BPL; and/or the uplink reference signal, if received power of which is below a predetermined threshold, causes the BS to determine it necessary to adjust the first uplink BPL.

In one embodiment, the uplink reference signal and the uplink control signal are Quasi-colocation, and are transmitted with the first transmitting beam at the terminal device side.

In one embodiment, the uplink reference signal is transmitted respectively with the first transmitting beam and a second candidate transmitting beam at the terminal device side, to track statuses of the first transmitting beam and the second candidate transmitting beam, and the first transmitting beam is transmitted more frequently than the second candidate transmitting beam.

In one embodiment, the method may further comprise: not to transmit with the first transmitting beam at the terminal device side from the time for adjusting or a specific time on, and to transmit to the BS feedback on the message for adjusting, if the message for adjusting indicates to cancel the first uplink BPL, wherein the feedback comprises the time for adjusting or the specific time.

In one embodiment, the method may further comprise: transmitting with the second transmitting beam at the terminal device side from the time for adjusting or a specific time on, and transmit to the BS feedback on the message for adjusting, if the message for adjusting indicates to establish a second uplink BPL based on candidate uplink paired beams, wherein the feedback comprises the time for adjusting or the specific time.

In one embodiment, the method may further comprise: performing uplink beam sweeping, and transmit to the BS response to the message for adjusting, if the message for adjusting indicates to perform uplink beam sweeping.

In one embodiment, the method may further comprise: completing within a same subframe the transmitting the uplink signal, receiving the message for adjusting and transmitting feedback to the message for adjusting, or completing within a same subframe the transmitting the uplink signal and receiving the message for adjusting.

In one embodiment, the method may further comprise, performing random access procedure to recover the uplink, if a plurality of same messages for adjusting are received within a given time.

Example of Another Electronic Device for Terminal Device Side

Figure 12A:
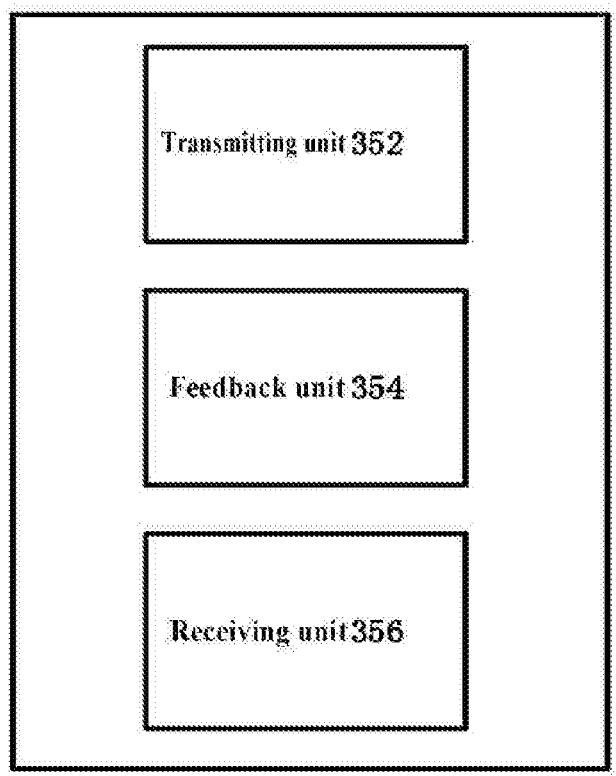
FIG. 12A illustrates an exemplary electronic device for a terminal device side according to an embodiment of the present disclosure.

FIG. 12A illustrates an exemplary electronic device for a terminal device side according to an embodiment of the present disclosure, where the terminal device can be used in various wireless communication systems. Various aspects of the electronic device 1200 shown in FIG. 12A may be similar to the foregoing electronic device 350. For example, the electronic device 1200 can comprise a similar transmitting unit 352 and a receiving unit 356. In addition, the electronic device 1200 may further comprise a feedback unit 354. In one embodiment, the feedback unit 354 can be configured to transmit feedback to the base station on a message for BPL adjusting.

Figure 12B:
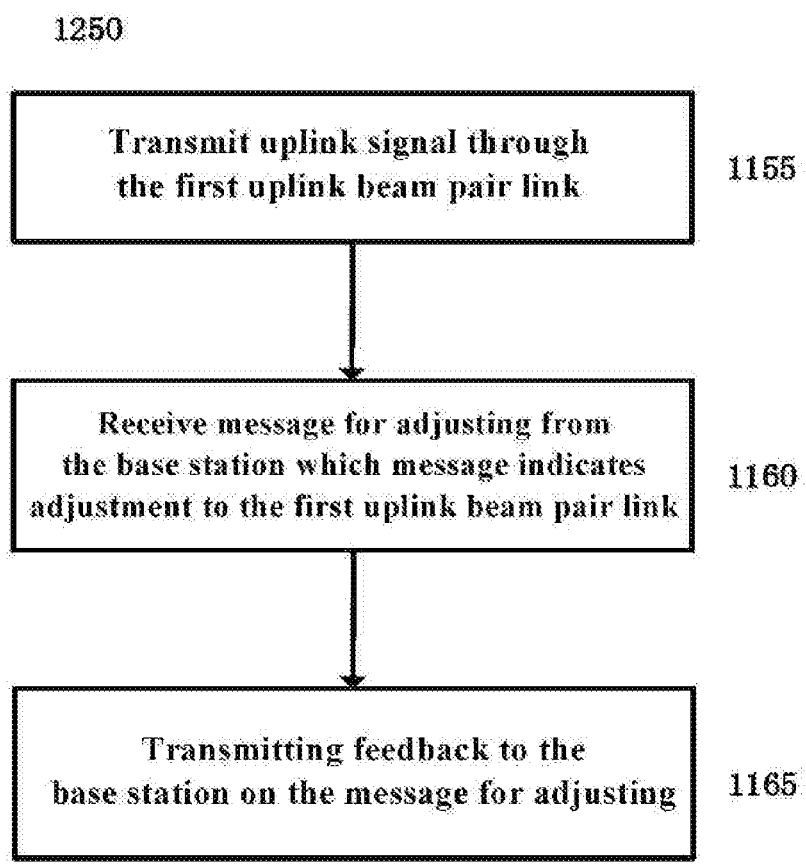
FIG. 12B illustrates an example method for communication according to an embodiment of the present disclosure.

FIG. 12B illustrates an example method for an electronic device 1200 according to an embodiment of the present disclosure. As shown in FIG. 12B, the method 1250 may be similar to the foregoing method 1150. For example, the method 1250 can comprise transmitting an uplink signal through a first uplink BPL (block 1255) and receiving an message for adjusting from a base station indicating an adjustment to the first uplink BPL (block 1260). In addition, the method 1250 may further comprise transmitting feedback to the base station on the message for BPL adjusting.

It should be understood that, for more details of the electronic device 1200 and the corresponding method 1250, reference may be made to the detailed description of the electronic device 350 and the method 1150 above, and therefore will not be repeated.

Each of the exemplary electronic devices and methods according to embodiments of the present disclosure has been described above. It should be understood that the operations or functions of these electronic devices may be combined with each other to achieve more or less operations or functions than described. The operational steps of the methods can also be combined with each other in any suitable order, so that similarly more or fewer operations are achieved than described.

It should be understood that the machine-executable instructions in the machine-readable storage medium or program product according to the embodiments of the present disclosure can be configured to perform operations corresponding to the device and method embodiments described above. When referring to the above device and method embodiments, the embodiments of the machine-readable storage medium or the program product are clear to those skilled in the art, and therefore description thereof will not be repeated herein. A machine-readable storage media and a program product for carrying or including the above-described machine-executable instructions also fall within the scope of the present disclosure. Such storage medium can comprise, but is not limited to, a floppy disk, an optical disk, a magneto-optical disk, a memory card, a memory stick, and the like.

Figure 13:
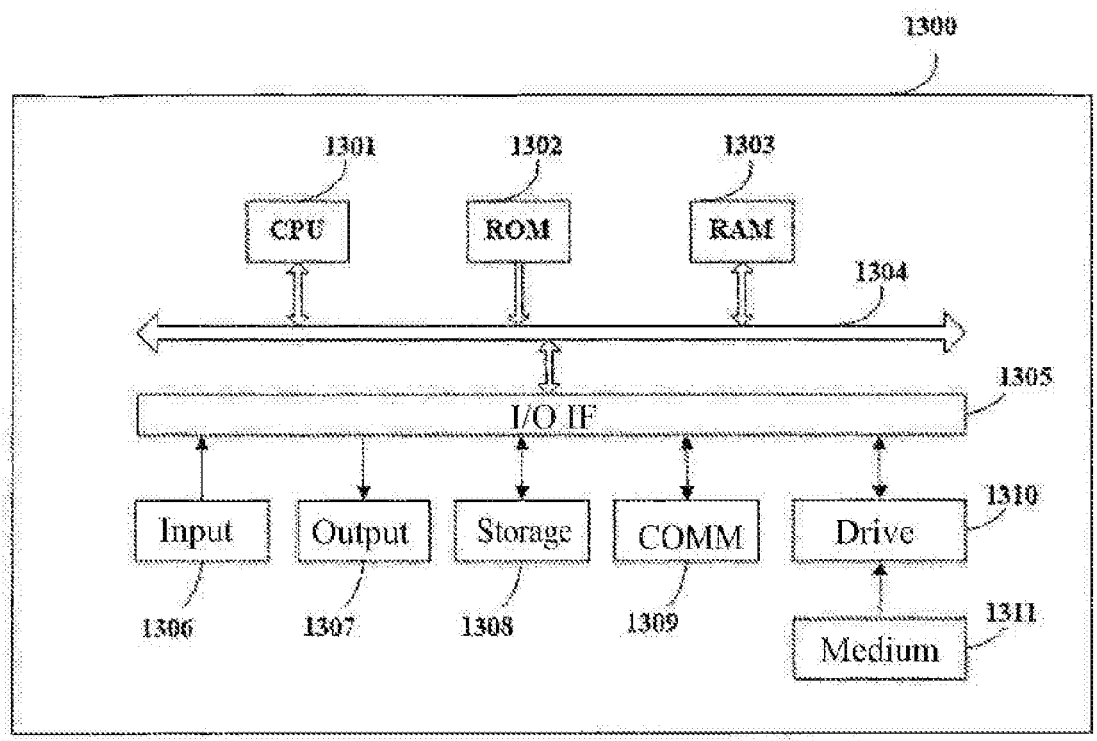
FIG. 13 is a block diagram of example structure of a personal computer which is an information processing device that can be employed in an embodiment of the present disclosure.

In addition, it should also be noted that the above series of processes and devices can also be implemented by software and/or firmware. In the case of being implemented by software and/or firmware, a program constituting the software is installed from a storage medium or a network to a computer having a dedicated hardware structure, such as the general-purpose personal computer 1300 shown in FIG. 13, which, when is installed with various programs, can execute various functions and so on. FIG. 13 is a block diagram showing an example structure of a personal computer which can be employed as an information processing device in the embodiment herein. In one example, the personal computer can correspond to the above-described exemplary terminal device in accordance with the present disclosure.

In FIG. 13, a central processing unit (CPU) 1301 executes various processes in accordance with a program stored in a read-only memory (ROM) 1302 or a program loaded from storage 1308 to a random access memory (RAM) 1303. In the RAM 1303, data required when the CPU 1301 executes various processes and the like is also stored as needed.

The CPU 1301, the ROM 1302, and the RAM 1303 are connected to each other via a bus 1304. Input/output interface 1305 is also connected to bus 1304.

The following components are connected to the input/output interface 1305: an input unit 1306 including a keyboard, a mouse, etc.; an output unit 1307 including a display such as a cathode ray tube (CRT), a liquid crystal display (LCD), etc., and a speaker, etc.; the storage 1308 including a hard disk etc.; and a communication unit 1309 including a network interface card such as a LAN card, a modem, etc.

The communication unit 1309 performs communication processing via a network such as the Internet.

The driver 1310 is also connected to the input/output interface 1305 as needed. A removable medium 1311 such as a magnetic disk, an optical disk, a magneto-optical disk, a semiconductor memory or the like is mounted on the drive 1310 as needed, so that a computer program read therefrom is installed into the storage 1308 as needed.

In the case where the above-described series of processing is implemented by software, a program constituting the software is installed from a network such as the Internet or a storage medium such as the removable medium 1311.

It will be understood by those skilled in the art that such a storage medium is not limited to the removable medium 1311 shown in FIG. 13 in which a program is stored and distributed separately from the device to provide a program to the user. Examples of the removable medium 1311 include a magnetic disk (including a floppy disk (registered trademark)), an optical disk (including a compact disk read only memory (CD-ROM) and a digital versatile disk (DVD)), a magneto-optical disk (including a mini disk (MD) (registered trademark)) and a semiconductor memory. Alternatively, the storage medium may be a ROM 1302, a hard disk included in the storage section 1308, or the like, in which programs are stored, and distributed to users together with the device containing them.

The technology of the present disclosure can be applied to various products. For example, the base stations mentioned in this disclosure can be implemented as any type of evolved Node B (gNB), such as a macro gNB and a small gNB. The small gNB can be an gNB covering a cell smaller than the macro cell, such as a pico gNB, a micro gNB, and a home (femto) gNB. Alternatively, the base station can be implemented as any other type of base station, such as a NodeB and a Base Transceiver Station (BTS). The base station can include: a body (also referred to as a base station device) configured to control radio communication; and one or more remote radio heads (RRHs) disposed at a different location from the body. In addition, various types of terminals which will be described below can each operate as a base station by performing base station functions temporarily or semi-persistently.

For example, the terminal device mentioned in the present disclosure, also referred to as a user device in some examples, can be implemented as a mobile terminal (such as a smartphone, a tablet personal computer (PC), a notebook PC, a portable game terminal, a portable/dongle type mobile router and digital camera) or in-vehicle terminal (such as car navigation device). The user device may also be implemented as a terminal that performs machine-to-machine (M2M) communication (also referred to as a machine type communication (MTC) terminal). Further, the user device may be a radio communication module (such as an integrated circuit module including a single wafer) installed on each of the above terminals.

Use cases according to the present disclosure will be described below with reference to FIGS. 14 to 17.

[Use Cases for Base Stations]

It should be understood that the term base station in this disclosure has the full breadth of its ordinary meaning, and includes at least a radio communication station used as portion of a wireless communication system or radio system to facilitate communication. Examples of the base station can be, for example but not limited to, the following: the base station can be either or both of a base transceiver station (BTS) and a base station controller (BSC) in the GSM system, and can be either or both of a radio network controller (RNC) or Node B in the WCDMA system, can be eNB in the LTE and LTE-Advanced system, or can be corresponding network nodes in future communication systems (e.g., the gNB that can appear in the 5G communication systems, eLTE eNB, etc.). Some of the functions in the base station of the present disclosure can also be implemented as an entity having a control function for communication in the scenario of a D2D, M2M, and V2V communication, or as an entity that plays a spectrum coordination role in the scenario of a cognitive radio communication.

First Use Case

Figure 14:
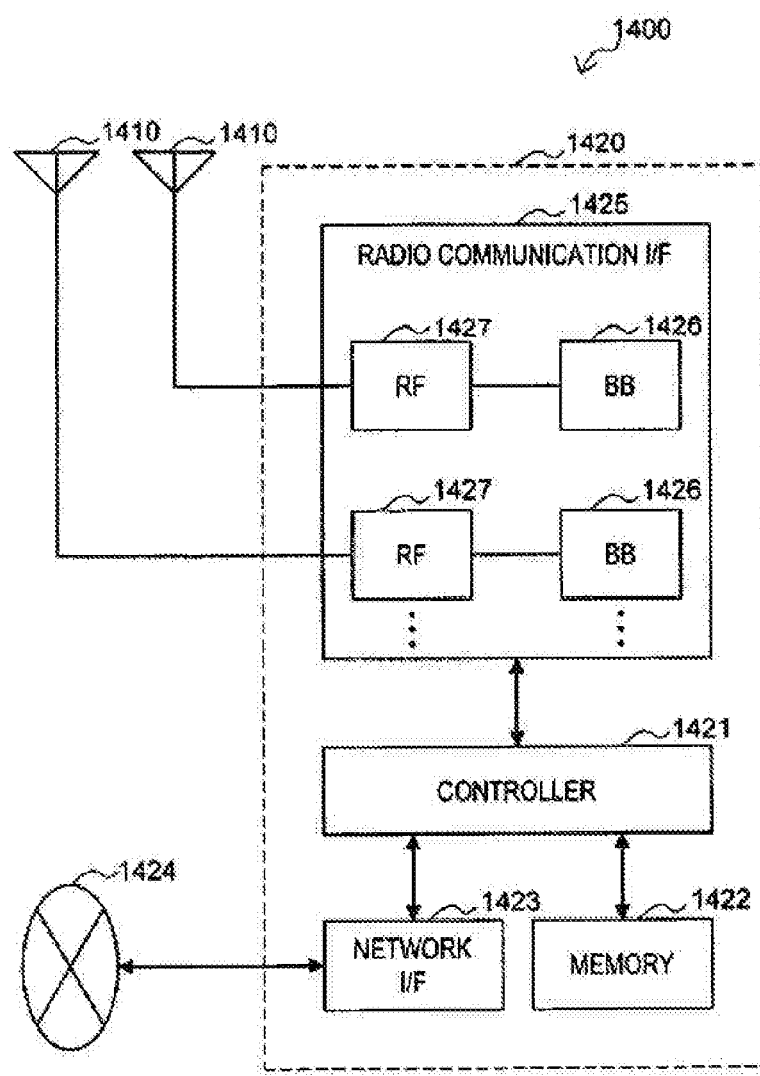
FIG. 14 is a block diagram illustrating a first example of a schematic configuration of a gNB to which the technology of the present disclosure can be applied.

FIG. 14 is a block diagram illustrating a first example of a schematic configuration of a gNB to which the technology of the present disclosure can be applied. The gNB 1400 includes a plurality of antennas 1410 and a base station device 1420. The base station device 1420 and each antenna 1410 may be connected to each other via an RF cable. In one implementation, the gNB 1400 (or base station device 1420) herein may correspond to the electronic devices 300A, 1300A, and/or 1500B described above.

Each of the antennas 1410 includes a single or multiple antenna elements (such as multiple antenna elements included in a Multiple Input and Multiple Output (MIMO) antenna), and is used for the base station device 1420 to transmit and receive radio signals. As shown in FIG. 14, the gNB 1400 may include multiple antennas 1410. For example, multiple antennas 1410 may be compatible with multiple frequency bands used by the gNB 1400.

The base station device 1420 includes a controller 1421, a memory 1422, a network interface 1423, and a radio communication interface 1425.

The controller 1421 may be, for example, a CPU or a DSP, and operates various functions of higher layers of the base station device 1420. For example, controller 1421 generates data packets from data in signals processed by the radio communication interface 1425, and transfers the generated packets via network interface 1423. The controller 1421 can bundle data from multiple baseband processors to generate the bundled packets, and transfer the generated bundled packets. The controller 1421 may have logic functions of performing control such as radio resource control, radio bearer control, mobility management, admission control, and scheduling. This control may be performed in corporation with a gNB or a core network node in the vicinity. The memory 1422 includes RAM and ROM, and stores a program that is executed by the controller 1421 and various types of control data such as a terminal list, transmission power data, and scheduling data.

The network interface 1423 is a communication interface for connecting the base station device 1420 to the core network 1424. Controller 1421 may communicate with a core network node or another gNB via the network interface 1423. In this case, the gNB 1400 and the core network node or other gNBs may be connected to each other through a logical interface such as an S1 interface and an X2 interface. The network interface 1423 may also be a wired communication interface or a radio communication interface for radio backhaul lines. If the network interface 1423 is a radio communication interface, the network interface 1423 may use a higher frequency band for radio communication than a frequency band used by the radio communication interface 1425.

The radio communication interface 1425 supports any cellular communication schemes, such as Long Term Evolution (LTE) and LTE-Advanced, and provides radio connection to a terminal positioned in a cell of the gNB 1400 via the antenna 1410. Radio communication interface 1425 may typically include, for example, a baseband (BB) processor 1426 and a RF circuit 1427. The BB processor 1426 may perform, for example, encoding/decoding, modulation/demodulation, and multiplexing/demultiplexing, and performs various types of signal processing of layers such as L1, Medium Access Control (MAC), Radio Link Control (RLC), and Packet Data Convergence Protocol (PDCP). Instead of controller 1421, the BB processor 1426 may have a part or all of the above-described logic functions. The BB processor 1426 may be a memory that stores a communication control program, or a module that includes a processor configured to execute the program and a related circuit. Updating the program may allow the functions of the BB processor 1426 to be changed. The module may be a card or a blade that is inserted into a slot of the base station device 1420. Alternatively, the module may also be a chip that is mounted on the card or the blade. Meanwhile, the RF circuit 1427 may include, for example, a mixer, a filter, and an amplifier, and transmits and receives radio signals via the antenna 1410. Although FIG. 14 illustrates an example in which one RF circuit 1427 is connected to one antenna 1410, the present disclosure is not limited to thereto; rather, one RF circuit 1427 may connect to a plurality of antennas 1410 at the same time.

As illustrated in FIG. 14, the radio communication interface 1425 may include the multiple BB processors 1426. For example, the multiple BB processors 1426 may be compatible with multiple frequency bands used by gNB 1400. As illustrated in FIG. 14, the radio communication interface 1425 may include the multiple RF circuits 1427. For example, the multiple RF circuits 1427 may be compatible with multiple antenna elements. Although FIG. 14 illustrates the example in which the radio communication interface 1425 includes the multiple BB processors 1426 and the multiple RF circuits 1427, the radio communication interface 1425 may also include a single BB processor 1426 or a single RF circuit 1427.

Second Use Case

Figure 15:
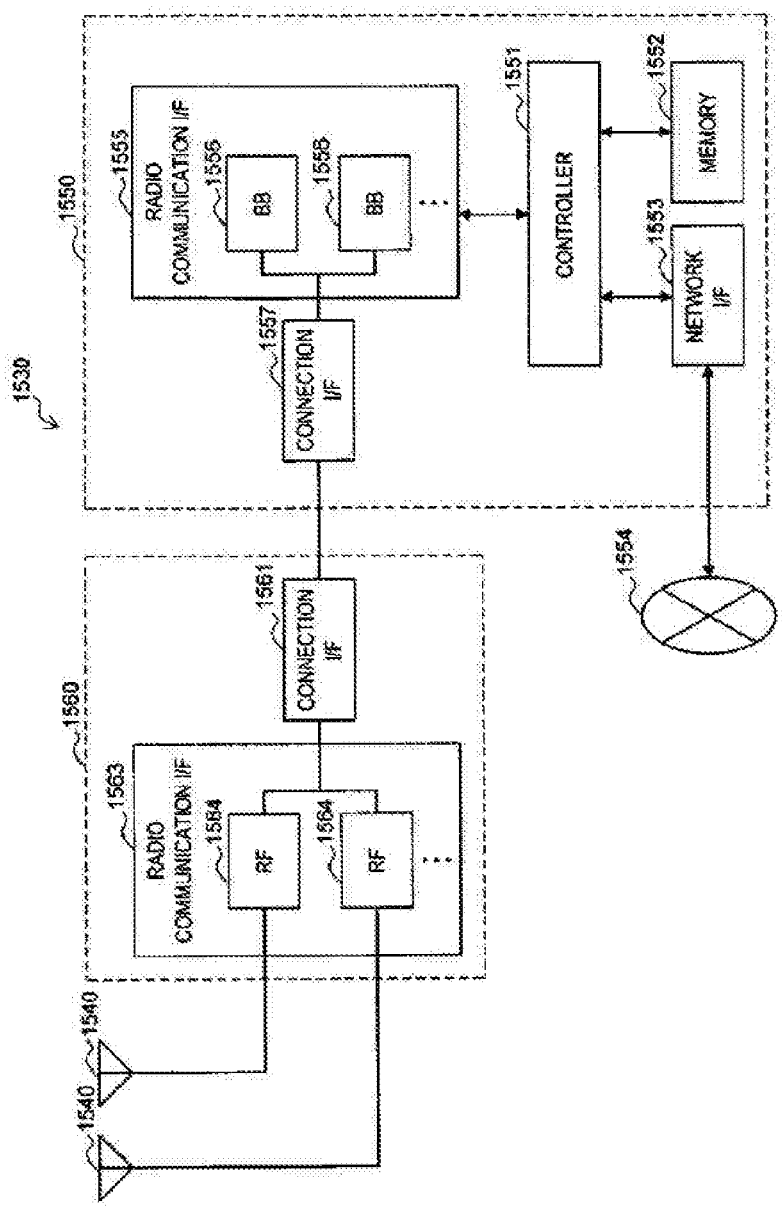
FIG. 15 is a block diagram illustrating a second example of a schematic configuration of a gNB to which the technology of the present disclosure can be applied.

FIG. 15 is a block diagram illustrating a second example of a schematic configuration of a gNB to which the technology of the present disclosure may be applied. The gNB 1530 includes a plurality of antennas 1540, a base station device 1550, and an RRH 1560. The RRH 1560 and each antenna 1540 may be connected to each other via an RF cable. The base station device 1550 and the RRH 1560 may be connected to each other via a high speed line such as a fiber optic cable. In one implementation, the gNB 1530 (or base station device 1550) herein may correspond to the electronic devices 300A, 1300A, and/or 1500B described above.

Each of the antennas 1540 includes a single or multiple antenna elements such as multiple antenna elements included in a MIMO antenna and is used for the RRH 1560 to transmit and receive radio signals. The gNB 1530 may include multiple antennas 1540, as illustrated in FIG. 15. For example, multiple antennas 1540 may be compatible with multiple frequency bands used by the gNB 1530.

The base station device 1550 includes a controller 1551, a memory 1552, a network interface 1553, a radio communication interface 1555, and a connection interface 1557. The controller 1551, the memory 1552, and the network interface 1553 are the same as the controller 1421, the memory 1422, and the network interface 1423 described with reference to FIG. 14.

The radio communication interface 1555 supports any cellular communication scheme (such as LTE and LTE-Advanced) and provides radio communication to terminals positioned in a sector corresponding to the RRH 1560 via the RRH 1560 and the antenna 1540. The radio communication interface 1555 may typically include, for example, a BB processor 1556. The BB processor 1556 is the same as the BB processor 1426 described with reference to FIG. 14, except that the BB processor 1556 is connected to the RF circuit 1564 of the RRH 1560 via the connection interface 1557. The radio communication interface 1555 may include the multiple BB processors 1556, as illustrated in FIG. 15. For example, the multiple BB processors 1556 may be compatible with multiple frequency bands used by the gNB 1530. Although FIG. 15 illustrates the example in which the radio communication interface 1555 includes multiple BB processors 1556, the radio communication interface 1555 may also include a single BB processor 1556.

The connection interface 1557 is an interface for connecting the base station device 1550 (radio communication interface 1555) to the RRH 1560. The connection interface 1557 may also be a communication module for communication in the above-described high speed line that connects the base station device 1550 (radio communication interface 1555) to the RRH 1560.

The RRH 1560 includes a connection interface 1561 and a radio communication interface 1563.

The connection interface 1561 is an interface for connecting the RRH 1560 (radio communication interface 1563) to the base station device 1550. The connection interface 1561 may also be a communication module for communication in the above-described high speed line.

The radio communication interface 1563 transmits and receives radio signals via the antenna 1540. Radio communication interface 1563 may typically include, for example, the RF circuitry 1564. The RF circuit 1564 may include, for example, a mixer, a filter, and an amplifier, and transmits and receives radio signals via the antenna 1540. Although FIG. 15 illustrates the example in which one RF circuit 1564 is connected to one antenna 1540, the present disclosure is not limited to thereto; rather, one RF circuit 1564 may connect to a plurality of antennas 1540 at the same time.

The radio communication interface 1563 may include multiple RF circuits 1564, as illustrated in FIG. 15. For example, multiple RF circuits 1564 may support multiple antenna elements. Although FIG. 15 illustrates the example in which the radio communication interface 1563 includes the multiple RF circuits 1564, the radio communication interface 1563 may also include a single RF circuit 1564.

[Use Cases Related to User Devices]

First Use Case

Figure 16:
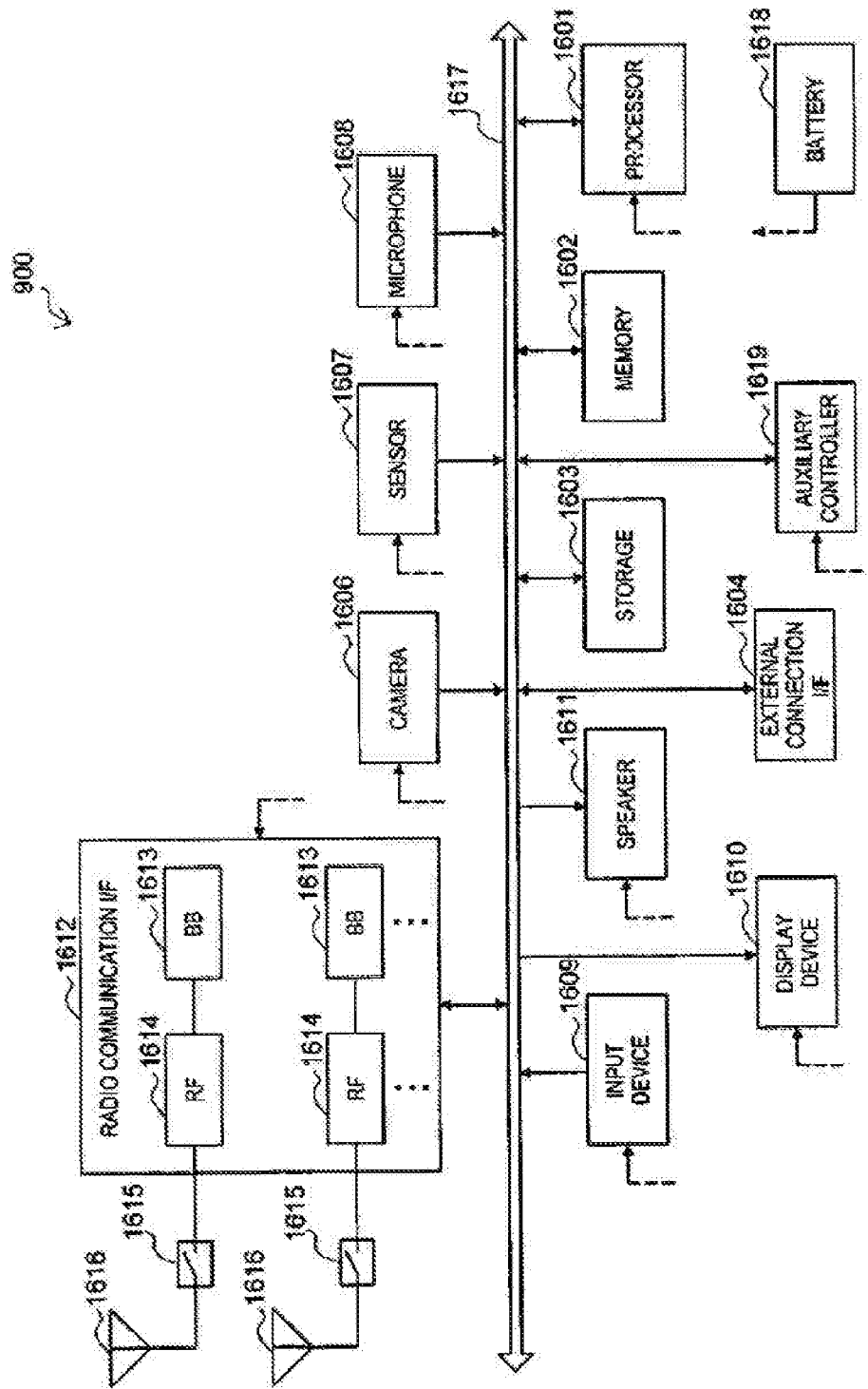
FIG. 16 is a block diagram illustrating an example of a schematic configuration of a smartphone to which the technology of the present disclosure can be applied.

FIG. 16 is a block diagram illustrating an example of a schematic configuration of a smartphone 1600 to which the technology of the present disclosure may be applied. The smartphone 1600 includes a processor 1601, a memory 1602, a storage 1603, an external connection interface 1604, an camera 1606, a sensor 1607, a microphone 1608, an input device 1609, a display device 1610, a speaker 1611, a radio communication interface 1612, one or more antenna switch 1615, one or more antennas 1616, a bus 1617, a battery 1618, and an auxiliary controller 1619. In one implementation, smartphone 1600 (or processor 1601) herein may correspond to terminal device 300B and/or 1500A described above.

The processor 1601 may be, for example, a CPU or a system on chip (SoC), and controls functions of an application layer and the other layers of the smartphone 1600. The memory 1602 includes RAM and ROM, and stores a program that is executed by the processor 1601, and data. The storage 1603 may include a storage medium such as a semiconductor memory and a hard disk. The external connection interface 1604 is an interface for connecting an external device such as a memory card and a universal serial bus (USB) device to the smartphone 1600.

The camera 1606 includes an image sensor such as a charge coupled device (CCD) and a complementary metal oxide semiconductor (CMOS), and generates a captured image. Sensor 1607 may include a group of sensors such as a measurement sensor, a gyro sensor, a geomagnetic sensor, and an acceleration sensor. The microphone 1608 converts the sounds that are input to the smartphone 1600 to audio signals. The input device 1609 includes, for example, a touch sensor configured to detect touch on a screen of the display device 1610, a keypad, a keyboard, a button, or a switch, and receives an operation or an information input from a user. The display device 1610 includes a screen such as a liquid crystal display (LCD) and an organic light emitting diode (OLED) display, and displays an output image of the smartphone 1600. The speaker 1611 converts audio signals that are output from the smartphone 1600 to sounds.

The radio communication interface 1612 supports any cellular communication scheme such as LTE and LTE-Advanced, and performs radio communication. The radio communication interface 1612 may typically include, for example, a BB processor 1613 and an RF circuitry 1614. The BB processor 1613 may perform, for example, encoding/decoding, modulation/demodulation, and multiplexing/demultiplexing, and performs various types of signal processing for radio communication. Meanwhile, the RF circuit 1614 may include, for example, a mixer, a filter, and an amplifier, and transmits and receives radio signals via the antenna 1616. The radio communication interface 1612 may be a one chip module that integrates the BB processor 1613 and the RF circuit 1614 thereon. The radio communication interface 1612 may include multiple BB processors 1613 and multiple RF circuits 1614, as illustrated in FIG. 16. Although FIG. 16 illustrates the example in which the radio communication interface 1612 includes multiple BB processors 1613 and multiple RF circuits 1614, the radio communication interface 1612 may also include a single BB processor 1613 or a single RF circuit 1614.

Furthermore, in addition to a cellular communication scheme, the radio communication interface 1612 may support additional type of radio communication schemes, such as short-range wireless communication schemes, a near field communication schemes, and a wireless local area network (LAN) scheme. In this case, the radio communication interface 1612 may include the BB processor 1613 and the RF circuitry 1614 for each radio communication scheme.

Each of the antenna switches 1615 switches connection destinations of the antenna 1616 among multiple circuits (such as circuits for different radio communication schemes) included in the radio communication interface 1612.

Each of the antennas 1616 includes a single or multiple antenna elements (such as multiple antenna elements included in a MIMO antenna) and is used for the radio communication interface 1612 to transmit and receive radio signals. The smartphone 1600 may include multiple antennas 1616, as illustrated in FIG. 16. Although FIG. 16 illustrates the example in which the smartphone 1600 includes multiple antennas 1616, the smartphone 1600 may also include a single antenna 1616.

Furthermore, the smartphone 1600 may include the antenna 1616 for each radio communication scheme. In this case, the antenna switch 1615 may be omitted from the configuration of the smartphone 1600.

The bus 1617 connects the processor 1601, the memory 1602, the storage 1603, the external connection interface 1604, the camera 1606, the sensor 1607, the microphone 1608, the input device 1609, the display device 1610, the speaker 1611, the radio communication interface 1612, and the auxiliary control 1619 to each other. The battery 1618 supplies power to blocks of the smartphone 1600 illustrated in FIG. 16 via feeder lines, which are partially shown as a dashed line in the figure. The auxiliary controller 1619 operates a minimum necessary function of the smartphone 1600, for example, in a sleep mode.

Second Use Case

Figure 17:
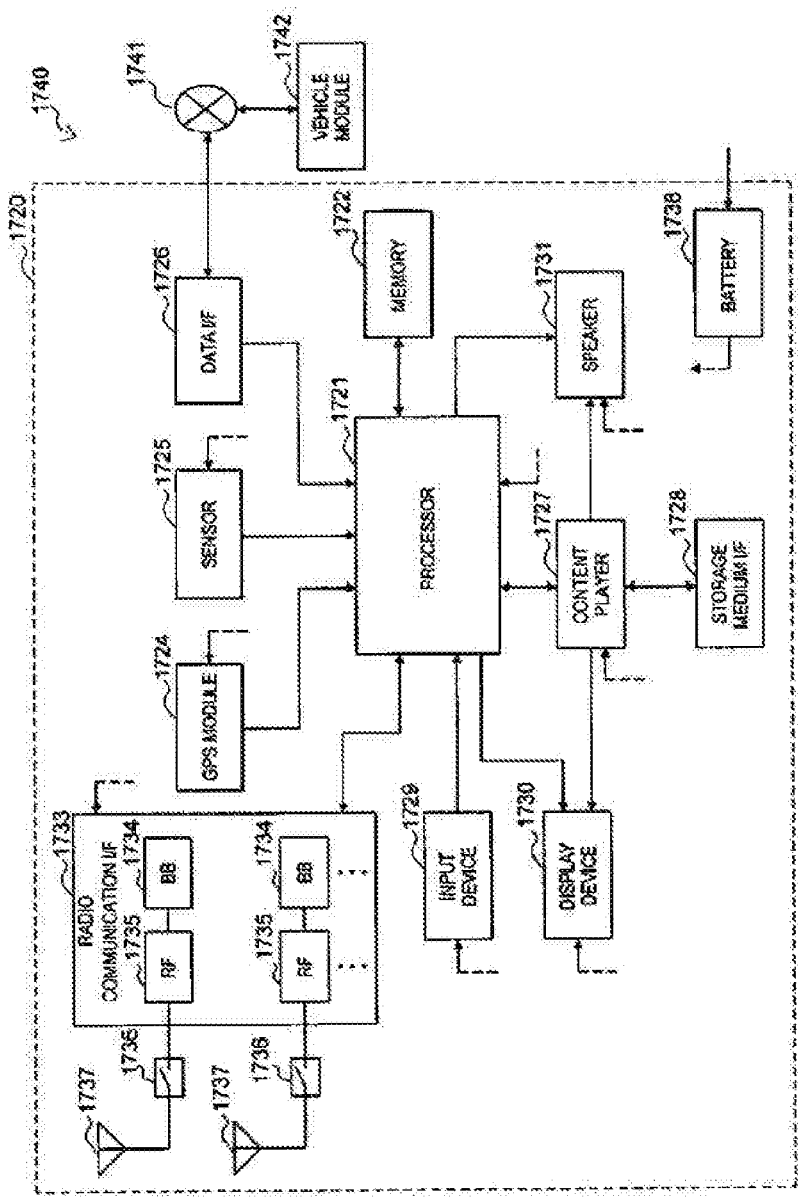
FIG. 17 is a block diagram illustrating an example of a schematic configuration of an automobile navigation device to which the technology of the present disclosure can be applied.

FIG. 17 is a block diagram illustrating an example of a schematic configuration of a car navigation device 1720 to which the technology of the present disclosure may be applied. The car navigation device 1720 includes a processor 1721, a memory 1722, a global positioning system (GPS) module 1724, a sensor 1725, a data interface 1726, a content player 1727, a storage medium interface 1728, an input device 1729, a display device 1730, a speaker 1731, and a radio communication interface 1733, one or more antenna switches 1736, one or more antennas 1737, and a battery 1738. In one implementation, car navigation device 1720 (or processor 1721) herein may correspond to terminal device 300B and/or 1500A described above.

The processor 1721 may be, for example, a CPU or a SoC, and controls a navigation function and other functions of the car navigation device 1720. The memory 1722 includes RAM and ROM, and stores a program that is executed by the processor 1721, and data.

The GPS module 1724 uses GPS signals received from a GPS satellite to measure a position, such as latitude, longitude, and altitude, of the car navigation device 1720. Sensor 1725 may include a group of sensors such as a gyro sensor, a geomagnetic sensor, and an air pressure sensor. The data interface 1726 is connected to, for example, an in-vehicle network 1741 via a terminal not shown, and acquires data generated by the vehicle, such as vehicle speed data.

The content player 1727 reproduces content stored in a storage medium (such as a CD and a DVD) that is inserted into the storage medium interface 1728. The input device 1729 includes, for example, a touch sensor configured to detect touch on a screen of the display device 1730, a button, or a switch, and receives an operation or an information input from a user. The display device 1730 includes a screen such as an LCD or an OLED display, and displays an image of the navigation function or content that is reproduced. The speaker 1731 outputs sounds of the navigation function or the content that is reproduced.

The radio communication interface 1733 supports any cellular communication scheme, such as LTE and LTE-Advanced, and performs radio communication. The radio communication interface 1733 may typically include, for example, a BB processor 1734 and an RF circuit 1735. The BB processor 1734 may perform, for example, encoding/decoding, modulation/demodulation, and multiplexing/demultiplexing, and performs various types of signal processing for radio communication. Meanwhile, the RF circuit 1735 may include, for example, a mixer, a filter, and an amplifier, and transmits and receives radio signals via the antenna 1737. The radio communication interface 1733 may also be a one chip module which integrates the BB processor 1734 and the RF circuit 1735 thereon. The radio communication interface 1733 may include multiple BB processors 1734 and multiple RF circuits 1735, as illustrated in FIG. 17. Although FIG. 17 illustrates the example in which the radio communication interface 1733 includes multiple BB processors 1734 and multiple RF circuits 1735, the radio communication interface 1733 may also include a single BB processor 1734 or a single RF circuit 1735.

Furthermore, in addition to a cellular communication scheme, the radio communication interface 1733 may support another type of radio communication scheme such as a short-range wireless communication scheme, a near-field communication scheme, and a wireless LAN scheme. In this case, the radio communication interface 1733 may include the BB processor 1734 and the RF circuit 1735 for each radio communication scheme.

Each of the antenna switches 1736 switches the connection destination of the antenna 1737 among multiple circuits (such as circuits for different radio communication schemes) included in the radio communication interface 1733.

Each of the antennas 1737 includes a single or multiple antenna elements, such as multiple antenna elements included in a MIMO antenna, and is used for the radio communication interface 1733 to transmit and receive radio signals. The car navigation device 1720 may include multiple antennas 1737, as illustrated in FIG. 17. Although FIG. 17 illustrates the example in which the car navigation device 1720 includes multiple antennas 1737, the car navigation device 1720 may also include a single antenna 1737.

Furthermore, the car navigation device 1720 may include the antenna 1737 for each radio communication scheme. In this case, the antenna switch 1736 may be omitted from the configuration of the car navigation device 1720.

The battery 1738 supplies power to blocks of the car navigation device 1720 illustrated in FIG. 17 via feeder lines that are partially shown as dashed lines in the figure. Battery 1738 accumulates power supplied from the vehicle.

The technology of the present disclosure may also be realized as an in-vehicle system (or vehicle) 1740 including one or more blocks of the car navigation device 1720, the in-vehicle network 1741, and the vehicle module 1742. The vehicle module 1742 generates vehicle data such as vehicle speed, engine speed, and faults information, and outputs the generated data to the in-vehicle network 1741.

Although the illustrative embodiments herein have been described with reference to the accompanying drawings, the present disclosure is certainly not limited to the above examples. Those skilled in the art can achieve various adaptions and modifications within the scope of the appended claims, and it will be appreciated that these adaptions and modifications certainly fall into the scope of the technology of the present disclosure.

For example, in the above embodiments, the multiple functions included in one module can be implemented by separate means. Alternatively, in the above embodiments, the multiple functions included in multiple modules can be implemented by separate means, respectively. In additions, one of the above functions can be implemented by multiple units. Needless to say, such configurations are included in the scope of the technology of the present disclosure.

In this specification, the steps described in the flowcharts include not only the processes performed sequentially in chronological order, but also the processes performed in parallel or separately but not necessarily performed in chronological order. Furthermore, even in the steps performed in chronological order, needless to say, the order can be changed appropriately.

Although the present disclosure and its advantages have been described in detail, it will be appreciated that various changes, replacements and transformations can be made without departing from the spirit and scope of the present disclosure as defined by the appended claims. In addition, the terms "include", "comprise" or any other variants of the embodiments herein are intended to be non-exclusive inclusion, such that the process, method, article or device including a series of elements includes not only these elements, but also those that are not listed specifically, or those that are inherent to the process, method, article or device. In case of further limitations, the element defined by the sentence "include one" does not exclude the presence of additional same elements in the process, method, article or device including this element.

The invention claimed is:

1. An electronic device for a Base Station (BS) side in a wireless communication system, comprising a processing circuitry configured to:
    establish a first uplink beam pair link (BPL) with a terminal device side based upon a predetermined process;
    monitor a status of an uplink signal from the terminal device side;
    determine it necessary to adjust the first uplink BPL based on the status of the uplink signal,
    wherein the first uplink BPL comprises:
        at least two first transmitting beams at the terminal device side and a first receiving beam at the BS side, or
        a first transmitting beam at the terminal side and at least two first receiving beams at the BS side; and
    perform an operation in order to adjust the first uplink BPL,
    wherein, when the first uplink BPL comprises the at least two first transmitting beams at the terminal device side and the first receiving beam at the BS side, the operation comprises one of:
        replacing only one of the at least two first transmitting beams at the terminal side with another transmitting beam at the terminal side while maintaining the first receiving beam at the BS side, or
        replacing the first receiving beam at the BS side with another receiving beam at the BS side while maintaining the at least two first transmitting beams at the terminal side, and
    wherein, when the first uplink BPL comprises the first transmitting beam at the terminal side and the at least two first receiving beams at the BS side, the operation comprises one of:
        replacing only one of the at least two first receiving beams at the BS side with another transmitting beam at the terminal side while maintaining the first transmitting beam at the terminal side, or
        replacing the first transmitting beam at the terminal side with another receiving beam at the BS side while maintaining the at least two first receiving beams at the BS side.

2. The electronic device of claim 1, wherein the operation further comprises:
    transmitting to the terminal device a message for adjusting that contains a BPL tag corresponding to a specification configuration of BS side and terminal side beams.

3. The electronic device of claim 1, wherein the uplink signal comprises at least one of an uplink control signal or an uplink reference signal, and the processing circuitry is further configured to:
    determine it necessary to adjust the first uplink BPL if the uplink control signal cannot be correctly detected; or
    determine it necessary to adjust the first uplink BPL if the reference signal received power is below a predetermined threshold.

4. The electronic device of claim 3, wherein the processing circuitry is further configured to:
    determine it necessary to adjust the first uplink BPL if the uplink control signal cannot be correctly detected for a first predetermined time duration; or
    determine it necessary to adjust the first uplink BPL if the reference signal received power is below a predetermined threshold for a second predetermined time duration.

5. The electronic device of claim 3, wherein the uplink reference signal and the uplink control signal are Quasi-colocation, and are transmitted with the first transmitting beam at the terminal device side.

6. The electronic device of claim 3, wherein the processing circuitry is further configured to determine a policy for adjusting the uplink BPL based on uplink beam status, and performing at least one of the following further operations:
    cancelling the first uplink BPL if there exist a plurality of activated uplink BPLs;
    establishing a second uplink BPL based on candidate uplink paired beams if there exist candidate uplink paired beams; or
    performing an uplink beam sweeping otherwise.

7. The electronic device of claim 1, wherein the message for adjusting comprises the uplink transmitting beam related to the adjustment, or comprises the uplink transmitting beam related to the adjustment and a time for adjusting.

8. The electronic device of claim 2,
    wherein the processing circuitry is further configured to:
        transmit the message for adjusting with a second transmitting beam at the BS side if feedback on the message for adjusting is not received from the terminal device after the message for adjusting is transmitted with the first transmitting beam at the BS side for given times or after a given time, wherein both the first and second transmitting beams at the BS side are paired with a same receiving beam at the terminal device side; or
        alter the transmitting beam at the BS side to transmit the message for adjusting if there is uplink and downlink beams correspondence, or
    wherein the processing circuitry is further configured to receive feedback to the message for adjusting from the terminal device, and is configured to:
        complete within a same subframe the monitoring the uplink signal, transmitting the message for adjusting and receiving feedback to the message for adjusting; or
        complete within a same subframe the monitoring the uplink signal and transmitting the message for adjusting.

9. The electronic device of claim 8, wherein, if feedback on the message for adjusting is not received from the terminal device after the message for adjusting is transmitted with the first transmitting beam at the BS side for the given times or after the given time, the processing circuitry is further configured to transmit the message for adjusting by at least one of the following:
    re-establishing a downlink BPL through beam sweeping of a downlink reference signal, so as to transmit the message for adjusting; or
    transmitting to the terminal device the message for adjusting by way of dual connectivity.

10. The electronic device of claim 9, wherein the transmitting to the terminal device the message for adjusting by way of dual connectivity comprises:
delivering the message for adjusting to another BS which serves the terminal device through dual connectivity, and the message for adjusting is indicated to the terminal device by the other BS.

11. An electronic device for a terminal device side in a wireless communication system, comprising a processing circuitry configured to:
transmit an uplink signal to a Base Station (BS) side through a first uplink beam pair link (BPL),
wherein the first uplink BPL comprises:
at least two first transmitting beams at the terminal device side and a first receiving beam at the BS side, or
a first transmitting beam at the terminal side and at least two first receiving beams at the BS side; and
receive a message for adjusting from the BS side which message indicates an adjustment to the first uplink BPL; and
performing the adjustment,
wherein, when the first uplink BPL comprises the at least two first transmitting beams at the terminal device side and the first receiving beam at the BS side, the adjustment comprises one of:
replacing only one of the at least two first transmitting beams at the terminal side with another transmitting beam at the terminal side while maintaining the first receiving beam at the BS side, or
replacing the first receiving beam at the BS side with another receiving beam at the BS side while maintaining the at least two first transmitting beams at the terminal side, and
wherein, when the first uplink BPL comprises the first transmitting beam at the terminal side and the at least two first receiving beams at the BS side, the adjustment comprises one of:
replacing only one of the at least two first receiving beams at the BS side with another transmitting beam at the terminal side while maintaining the first transmitting beam at the terminal side, or
replacing the first transmitting beam at the terminal side with another receiving beam at the BS side while maintaining the at least two first receiving beams at the BS side.

12. The electronic device of claim 11, wherein the message for adjusting comprises:
the uplink transmitting beam related to the adjustment, or the uplink transmitting beam related to the adjustment and a time for adjusting.

13. The electronic device of claim 11, wherein the uplink signal comprises at least one of an uplink control signal or an uplink reference signal,
wherein the uplink control signal, if cannot be correctly detected, causes the BS to determine it necessary to adjust the first uplink BPL; or
wherein the uplink reference signal, if received power of which is below a predetermined threshold, causes the BS to determine it necessary to adjust the first uplink BPL.

14. The electronic device of claim 13,
wherein the uplink reference signal and the uplink control signal are Quasi-colocation, and are transmitted with the first transmitting beam at the terminal device side, or wherein the uplink reference signal is transmitted respectively with the first transmitting beam and a second candidate transmitting beam at the terminal device side, to track statuses of the first transmitting beam and the second candidate transmitting beam, and the first transmitting beam is transmitted more frequently than the second candidate transmitting beam.

15. The electronic device of claim 13,
wherein, if the message for adjusting indicates to cancel the first uplink BPL, the processing circuitry is further configured:
not to transmit with the first transmitting beam at the terminal device side from the time for adjusting or a specific time on, and to transmit to the BS feedback on the message for adjusting, and
wherein the feedback comprises the time for adjusting or the specific time.

16. The electronic device of claim 13, wherein, if the message for adjusting indicates to establish a second uplink BPL based on candidate uplink paired beams, the processing circuitry is further configured to:
transmit with the second transmitting beam at the terminal device side from the time for adjusting or a specific time on, and transmit to the BS feedback on the message for adjusting,
wherein the feedback comprises the time for adjusting or the specific time.

17. The electronic device of claim 13, wherein, if the message for adjusting indicates to perform uplink beam sweeping, the processing circuitry is further configured to:
perform uplink beam sweeping, and transmit to the BS a response to the message for adjusting.

18. The electronic device of claim 15, wherein the processing circuitry is further configured to:
complete within a same subframe the transmitting the uplink signal, the receiving the message for adjusting and the transmitting the feedback to the message for adjusting; or
complete within a same subframe the transmitting the uplink signal and receiving the message for adjusting.

19. The electronic device of claim 15, wherein the processing circuitry is further configured to perform a random access procedure to recover the uplink, if a plurality of same messages for adjusting are received within a given time.

20. A method for a device of a Base Station (BS) side of a wireless communication system, the method comprising:
establishing a first uplink beam pair link (BPL) with a terminal device side based upon a predetermined process;
monitoring a status of an uplink signal from the terminal device side;
determining it necessary to adjust the first uplink BPL based on the status of the uplink signal,
wherein the first uplink BPL comprises:
at least two first transmitting beams at the terminal device side and a first receiving beam at the BS side, or
a first transmitting beam at the terminal side and at least two first receiving beams at the BS side; and
performing an operation in order to adjust the first uplink BPL,
wherein, when the first uplink BPL comprises the at least two first transmitting beams at the terminal device side and the first receiving beam at the BS side, the operation comprises one of:
replacing only one of the at least two first transmitting beams at the terminal side with another transmitting beam at the terminal side while maintaining the first receiving beam at the BS side, or replacing the first receiving beam at the BS side with another receiving beam at the BS side while maintaining the at least two first transmitting beams at the terminal side, and wherein, when the first uplink BPL comprises the first transmitting beam at the terminal side and the at least two first receiving beams at the BS side, the operation comprises one of:

replacing only one of the at least two first receiving beams at the BS side with another transmitting beam at the terminal side while maintaining the first transmitting beam at the terminal side, or replacing the first transmitting beam at the terminal side with another receiving beam at the BS side while maintaining the at least two first receiving beams at the BS side.

\* \* \* \* \*